US008788481B2

(12) United States Patent
Imaki et al.

(10) Patent No.: US 8,788,481 B2
(45) **Date of Patent: *Jul. 22, 2014**

(54) METHOD FOR PROCESSING STREAM DATA AND SYSTEM THEREOF

(71) Applicant: Hitachi, Ltd., Tokyo (JP)

(72) Inventors: Tsuneyuki Imaki, Kawasaki (JP); Itaru Nishizawa, Koganei (JP); Toshihiko Kashiyama, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/778,255

(22) Filed: Feb. 27, 2013

(65) Prior Publication Data

US 2013/0173587 A1 Jul. 4, 2013

Related U.S. Application Data

(63) Continuation of application No. 12/542,887, filed on Aug. 18, 2009, now Pat. No. 8,402,015.

(30) Foreign Application Priority Data

Oct. 29, 2008 (JP) ................................ 2008-278306

(51) Int. Cl.
*G06F 17/30* (2006.01)

(52) U.S. Cl.
USPC .......................................................... 707/713

(58) Field of Classification Search
CPC ..................... G06F 17/30442; G06F 17/30516
USPC .......................................... 707/713, 718, 769
See application file for complete search history.

(56) References Cited

U.S. PATENT DOCUMENTS 7,644,110 B2 1/2010 Nishizawa et al.
7,739,265 B2 6/2010 Jain et al.
7,849,227 B2 12/2010 Kashiyama et al.
7,865,502 B2 1/2011 Balmin et al.

(Continued)

FOREIGN PATENT DOCUMENTS

JP 2001-222452 8/2001

OTHER PUBLICATIONS

Babock et al., Models and Issues in Data Stream Systems, Deparatment of Computer Science, Stanford University, Stanford, CA, pp. 1-30.

(Continued)

*Primary Examiner* — Jorge A Casanova
(74) *Attorney, Agent, or Firm* — Mattingly & Malur, PC

(57) ABSTRACT

A network interface receives stream data and a processor processes the stream data. The processor: constructs an operator graph comprising information regarding a plurality of operators for processing the stream data based on a query; assigns an operator execution order to the plurality of operators based on an inter-operator input and output relation, with respect to all of the operators on the operator graph; extracts a set of the operators that maintains the stream data assigned with a time stamp, a time of which is earlier than or equal to a reference time, in an input queue; and executes processing of the stream data assigned with the time stamp, having the earliest time, in the operator assigned a minimum operator graph execution order among the operators and maintaining the stream data assigned with the time stamp having the earliest time, among the extracted set of the operators.

4 Claims, 48 Drawing Sheets

(56) References Cited

U.S. PATENT DOCUMENTS

| | | | |
|---|---|---|---|
| 7,941,413 | B2 | 5/2011 | Kashiyama et al. |
| 7,945,540 | B2 | 5/2011 | Park et al. |
| 7,979,420 | B2 | 7/2011 | Jain et al. |
| 7,996,388 | B2 | 8/2011 | Jain et al. |
| 8,122,006 | B2 | 2/2012 | de Castro Alves et al. |

OTHER PUBLICATIONS

B. Babcock et al., Models and Issues in Data Stream Systems, In Proc. of PODS 2002, pp. 1-30, 2002.

T. Johnson et al., A Heartbeat Mechanism and its Application in Gigascope, In Proc. of VLDB 2005, pp. 1079-1088, 2005.

B. Babcock et al., Operator Scheduling in Data Stream Systems, pp. 1-31, 2005.

A. Arasu et al., The CQL Continuous Query Language: Semantic Foundations and Query Execution, pp. 1-32, 2005.

FIG. 3

301
```
REGISTER STREAM
market(stock_id VARCHAR(30),price INT);
```
502
```
REGISTER STREAM
resource_stream(val INT);
```
303
```
REGISTER STREAM
stock_stream(id VARCHAR(30),num INT,price INT);
```
310
```
REGISTER QUERY buy_event
 ISTREAM(
   SELECT stock.id,0 AS num,market.price
     FROM stock,resource,market[NOW]
    WHERE stock.id=market.stock_id
          AND stock.num=0
          AND market.price < 500
          AND resource.value > market.price * 1000
);
```
311
```
REGISTER QUERY resource
SELECT * FROM resource_stream[ROWS 1];
```
313
```
REGISTER QUERY sell_event
 ISTREAM(
   SELECT stock.id,stock.num,-1 AS price
     FROM stock,market[RANGE 5 MINUTE]
    WHERE stock.id=market.stock_id AND stock.num > 0
    GROUP BY stock.id,stock.num,stock.price
   HAVING avg(market.price) > stock.price * 1.05
);
```
314
```
REGISTER QUERY stock
SELECT * FROM stock_stream[PARTITION BY stock_stream.id ROWS 1];
```
316
```
REGISTER QUERY order
RSTREAM[30 SECOND](
   SELECT * FROM buy_event[NOW]
 UNION ALL
   SELECT * FROM sell_event[NOW]
);
```

SYSTEM TIME=9:15'00

FIG.5

301
```
REGISTER STREAM
market(stock_id VARCHAR(30),price INT);
```

502
```
REGISTER STREAM
resource_stream(val INT);
```

303
```
REGISTER STREAM
stock_stream(id VARCHAR(30),num INT,price INT);
```

310
```
REGISTER QUERY buy_event
 ISTREAM(
   SELECT stock.id,0 AS num,market.price
     FROM stock,resource,market[NOW]
    WHERE stock.id=market.stock_id
          AND stock.num=0
          AND market.price < 500
          AND resource.value > market.price * 1000
);
```

311
```
REGISTER QUERY resource
SELECT * FROM resource_stream[ROWS 1];
```

512
```
REGISTER QUERY resource_stream
 ISTREAM(
   SELECT * FROM initial_resource[NOW]
     UNION ALL
   SELECT resource.val-buy_event.price * 1000 AS val
     FROM resource,buy_event[now]);
```

314
```
REGISTER QUERY stock
SELECT * FROM stock_stream[PARTITION BY stock_stream.id ROWS 1];
```

SYSTEM TIME=9:13'30

SYSTEM TIME=9:14'26

| ID | OUTPUT DESTINATION OPERATOR ID |
|---|---|
| 400 | 401 |
| 401 | 402 |
| 402 | 405 |
| 400 | 404 |
| 404 | 405 |
| 405 | 406 |
| 406 | 407 |
| 407 | 460 |
| 410 | 411 |
| 411 | 404 |
| 430 | 431 |
| 431 | 433 |
| 432 | 433 |
| 433 | 434 |
| 434 | 435 |
| 435 | 436 |
| 436 | 437 |
| 437 | 461 |
| 440 | 441 |
| 441 | 403,432 |
| 460 | 462 |
| 461 | 462 |
| 462 | 463 |
| 463 | |

1330

| ID | NUMBER OF TRANSIT INPUTS |
|---|---|
| 400 | 0 |
| 401 | 1 |
| 402 | 1 |
| 400 | 1 |
| 404 | 2 |
| 405 | 2 |
| 406 | 1 |
| 407 | 1 |
| 410 | 0 |
| 411 | 1 |
| 430 | 0 |
| 431 | 1 |
| 432 | 1 |
| 433 | 2 |
| 434 | 1 |
| 435 | 1 |
| 436 | 1 |
| 437 | 1 |
| 440 | 0 |
| 441 | 1 |
| 460 | 1 |
| 461 | 1 |
| 462 | 2 |
| 463 | 1 |

| ID | NUMBER OF TRANSIT INPUTS |
|---|---|
| 400 | 0 |
| 401 | 1 |
| 402 | 1 |
| 400 | 1 |
| 404 | 2 |
| 405 | 2 |
| 406 | 1 |
| 407 | 1 |
| 410 | 0 |
| 411 | 1 |
| 430 | 0 |
| 431 | 0 |
| 432 | 1 |
| 433 | 1 |
| 434 | 1 |
| 435 | 1 |
| 436 | 1 |
| 437 | 1 |
| 440 | 0 |
| 441 | 1 |
| 460 | 1 |
| 461 | 1 |
| 462 | 2 |
| 463 | 1 |

OPERATOR NUMBER

3 — 1310

TRAVERSE STACK — 1340

440
400
410

1400

| ID | EXECUTION ORDER |
|---|---|
| 430 | 1 |
| 431 | 2 |

1351

1330

| ID | NUMBER OF TRANSIT INPUTS |
|---|---|
| 400 | 0 |
| 401 | 1 |
| 402 | 1 |
| 400 | 0 |
| 404 | 2 |
| 405 | 2 |
| 406 | 1 |
| 407 | 1 |
| 410 | 0 |
| 411 | 1 |
| 430 | 0 |
| 431 | 0 |
| 432 | 0 |
| 433 | 0 |
| 434 | 1 |
| 435 | 1 |
| 436 | 1 |
| 437 | 1 |
| 440 | 0 |
| 441 | 0 |
| 460 | 1 |
| 461 | 1 |
| 462 | 2 |
| 463 | 1 |

OPERATOR NUMBER

6 — 1310

TRAVERSE STACK — 1340

433
403
400
410

1400

| ID | EXECUTION ORDER |
|---|---|
| 430 | 1 |
| 431 | 2 |
| 440 | 3 |
| 441 | 4 |
| 432 | 5 |

| ID | NUMBER OF TRANSIT INPUTS |
|---|---|
| 400 | 0 |
| 401 | 1 |
| 402 | 1 |
| 400 | 0 |
| 404 | 2 |
| 405 | 2 |
| 406 | 1 |
| 407 | 1 |
| 410 | 0 |
| 411 | 1 |
| 430 | 0 |
| 431 | 0 |

| | |
|---|---|
| 432 | 0 |
| 433 | 0 |
| 434 | 0 |
| 435 | 0 |
| 436 | 0 |
| 437 | 0 |
| 440 | 0 |
| 441 | 0 |
| 460 | 1 |
| 461 | 0 |
| 462 | 1 |
| 463 | 1 |

OPERATOR NUMBER

12 — 1310

TRAVERSE STACK — 1340

| |
|---|
| 403 |
| 400 |
| 410 |

1400

| ID | EXECUTION ORDER |
|---|---|
| ⋮ | ⋮ |
| 433 | 6 |
| 434 | 7 |
| 435 | 8 |
| 436 | 9 |
| 437 | 10 |
| 461 | 11 |

1353

1330

| ID | NUMBER OF TRANSIT INPUTS |
|---|---|
| 400 | 0 |
| 401 | 0 |
| 402 | 0 |
| 400 | 0 |
| 404 | 1 |
| 405 | 1 |
| 406 | 1 |
| 407 | 1 |
| 410 | 0 |
| 411 | 1 |
| 430 | 0 |
| 431 | 0 |

| | |
|---|---|
| 432 | 0 |
| 433 | 0 |
| 434 | 0 |
| 435 | 0 |
| 436 | 0 |
| 437 | 0 |
| 440 | 0 |
| 441 | 0 |
| 460 | 1 |
| 461 | 1 |
| 462 | 1 |
| 463 | 1 |

OPERATOR NUMBER

16 — 1310

TRAVERSE STACK — 1340

| |
|---|
| 410 |

1400

| ID | EXECUTION ORDER |
|---|---|
| ⋮ | ⋮ |
| 403 | 12 |
| 400 | 13 |
| 401 | 14 |
| 402 | 15 |

| ID | EXECUTION ORDER |
|---|---|
| 430 | 1 |
| 431 | 2 |
| 440 | 3 |
| 441 | 4 |
| 432 | 5 |
| 433 | 6 |
| 434 | 7 |
| 435 | 8 |
| 436 | 9 |
| 437 | 10 |
| 461 | 11 |
| 403 | 12 |
| 400 | 13 |
| 401 | 14 |
| 402 | 15 |
| 410 | 16 |
| 411 | 17 |
| 404 | 18 |
| 405 | 19 |
| 406 | 20 |
| 407 | 24 |
| 460 | 22 |
| 462 | 23 |
| 463 | 24 |

FIG.20

301
```
REGISTER STREAM
market(stock_id VARCHAR(30),price INT);
```

502
```
REGISTER STREAM
initial_resource(val INT);
```

303
```
REGISTER STREAM
stock_stream(id VARCHAR(30),num INT,price INT);
```

310
```
REGISTER QUERY buy_event
 ISTREAM(
   SELECT stock.id,0 AS num,market.price
     FROM stock,resource,market[NOW]
    WHERE stock.id=market.stock_id
          AND stock.num=0
          AND market.price < 500
          AND resource.value > market.price * 1000
);
```

311
```
REGISTER QUERY resource
SELECT * FROM resource_stream[ROWS 1];
```

2012
```
REGISTER QUERY resource_stream
 ISTREAM(
   SELECT * FROM initial_resource[NOW]
     UNION ALL
   SELECT resource.val-buy_event.price * 1000 AS val
     FROM resource,buy_event[now])<NOW>;
```

314
```
REGISTER QUERY stock
SELECT * FROM stock_stream[PARTITION BY stock_stream.id ROWS 1];
```

FIG.23A

301
```
REGISTER STREAM
market(stock_id VARCHAR(30),price INT);
```

502
```
REGISTER STREAM
initial_resource(val INT),
```

2303
```
REGISTER STREAM
initial_stock(id VARCHAR(30),num INT,price INT);
```

```
REGISTER QUERY buy_event
 ISTREAM(
   SELECT stock.id,0 AS num,market.price
     FROM stock,resource,market[NOW]
    WHERE stock.id=market.stock_id
          AND stock.num=0
          AND market.price < 500
          AND resource.value > market.price * 1000
);
```

311

```
REGISTER QUERY resource
SELECT * FROM resource_stream[ROWS 1];
```

2012

```
REGISTER QUERY resource_stream
 ISTREAM(
   SELECT * FROM initial_resource[NOW]
     UNION ALL
   SELECT resource.val-buy_event.price * 1000 AS val
     FROM resource,buy_event[now])<NOW>;
```

313

```
REGISTER QUERY sell_event
 ISTREAM(
   SELECT stock.id,stock.num,-1 AS price
     FROM stock,market[RANGE 5 MINUTE]
    WHERE stock.id=market.stock_id AND stock.num > 0
    GROUP BY stock.id,stock.num,stock.price
   HAVING avg(market.price) > stock.price * 1.05
);
```

314

```
REGISTER QUERY stock
SELECT * FROM stock_stream[PARTITION BY stock_stream.id ROWS 1];
```

2315

```
REGISTER QUERY stock_stream
 ISTREAM(
   SELECT * FROM initial_stock[NOW]
 UNION ALL
   SELECT * FROM sell_event[NOW]
 UNION ALL
   SELECT * FROM buy_event[NOW]
)<NOW>;
```

| ID | OUTPUT DESTINATION OPERATOR ID |
|---|---|
| 2400 | 2401 |
| 2401 | 2402 |
| 2402 | 2405 |
| 2403 | 2404 |
| 2404 | 2405 |
| 2405 | 2406 |
| 2406 | 2407 |
| 2407 | 2422,2454 |
| 2410 | 2404,2423 |
| 2420 | 2421 |
| 2421 | 2425 |
| 2422 | 2423 |
| 2423 | 2424 |
| 2424 | 2425 |
| 2425 | 2426 |
| 2426 | 2427 |
| 2427 | 2410 |
| 2430 | 2431 |
| 2431 | 2433 |
| 2432 | 2433 |
| 2433 | 2434 |
| 2434 | 2435 |
| 2435 | 2436 |
| 2436 | 2437 |
| 2437 | 2452 |
| 2440 | 2403,2432 |
| 2450 | 2451 |
| 2451 | 2453 |
| 2452 | 2453 |
| 2453 | 2455 |
| 2454 | 2455 |
| 2455 | 2456 |
| 2456 | 2457 |
| 2457 | 2440 |
| DUMMY | 2400,2420,2430,2450 |

| COMPONENT ID | OUTPUT DESTINATION COMPONENT |
|---|---|
| 2400 | 2401 |
| 2401 | 2402 |
| 2402 | 3000 |
| 2420 | 2421 |
| 2421 | 3000 |
| 2430 | 2431 |
| 2431 | 3000 |
| 2450 | 2451 |
| 2451 | 3000 |
| DUMMY | 2400,2420,2430,2450 |
| 3000 | |

3030

| COMPONENT ID | NUMBER OF TRANSIT INPUT |
|---|---|
| 2400 | 1 |
| 2401 | 1 |
| 2402 | 1 |
| 2420 | 1 |
| 2421 | 1 |
| 2430 | 1 |
| 2431 | 1 |
| 2450 | 1 |
| 2451 | 1 |
| DUMMY | 0 |
| 3000 | 4 |

3001

{ 2403,2404,2405,2406,2407,2410,2422,2423,2424,2425
2426,2427,3432,2433,2434,2435,2436,2437,2440,2452
2453,2454,2455,2456,2457 }

OPERATOR NUMBER [0] 3010

TRAVERSE STACK 3040

DUMMY

| COMPONENT ID | NUMBER OF TRANSIT INPUT |
|---|---|
| 2400 | 0 |
| 2401 | 1 |
| 2402 | 1 |
| 2420 | 0 |
| 2421 | 1 |
| 2430 | 0 |
| 2431 | 1 |
| 2450 | 0 |
| 2451 | 1 |
| DUMMY | 0 |
| 3000 | 4 |

OPERATOR NUMBER 1 (3010)

TRAVERSE STACK (3040): 2430, 2450, 2400, 2420

3100

| ID | EXECUTION ORDER |
|---|---|
| DUMMY | 0 |

3051

3030

| COMPONENT ID | NUMBER OF TRANSIT INPUT |
|---|---|
| 2400 | 0 |
| 2401 | 1 |
| 2402 | 1 |
| 2420 | 0 |
| 2421 | 1 |
| 2430 | 0 |
| 2431 | 0 |
| 2450 | 0 |
| 2451 | 1 |
| DUMMY | 0 |
| 3000 | 3 |

OPERATOR NUMBER 3 (3010)

TRAVERSE STACK (3040): 2450, 2400, 2420

3100

| ID | EXECUTION ORDER |
|---|---|
| DUMMY | 0 |
| 2430 | 1 |
| 2431 | 2 |

3052

3030

| COMPONENT ID | NUMBER OF TRANSIT INPUT |
|---|---|
| 2400 | 0 |
| 2401 | 0 |
| 2402 | 0 |
| 2420 | 0 |
| 2421 | 0 |
| 2430 | 0 |
| 2431 | 0 |
| 2450 | 0 |
| 2451 | 0 |
| DUMMY | 0 |
| 3000 | 0 |

OPERATOR NUMBER 10 (3010)

TRAVERSE STACK (3040): 3000

3100

| ID | EXECUTION ORDER |
|---|---|
| DUMMY | 0 |
| 2430 | 1 |
| 2431 | 2 |
| 2450 | 3 |
| 2451 | 4 |
| 2400 | 5 |
| 2401 | 6 |
| 2402 | 7 |
| 2420 | 8 |
| 2421 | 9 |

| ID | OUTPUT DESTINATION OPERATOR ID |
|---|---|
| 2403 | 2404 |
| 2404 | 2405 |
| 2405 | 2406 |
| 2406 | 2407 |
| 2407 | 2422,2454 |
| 2410 | 2404,2423 |
| 2422 | 2423 |
| 2423 | 2424 |
| 2424 | 2425 |
| 2425 | 2426 |
| 2426 | 2427 |
| 2427 | 2410 |
| 2432 | 2433 |
| 2433 | 2434 |
| 2434 | 2435 |
| 2435 | 2436 |
| 2436 | 2437 |
| 2437 | 2452 |
| 2440 | 2403,2432 |
| 2452 | 2453 |
| 2453 | 2455 |
| 2454 | 2455 |
| 2455 | 2456 |
| 2456 | ~~2457~~ |
| 2457 | 2440 |

3021

| COMPONENT ID | OUTPUT DESTINATION COMPONENT |
|---|---|
| 2403 | 3002 |
| 2432 | 2433 |
| 2433 | 2434 |
| 2434 | 2435 |
| 2435 | 2436 |
| 2436 | 2437 |
| 2437 | 2452 |
| 2440 | 2403,2432 |
| 2452 | 2453 |
| 2453 | 2455 |
| 2454 | 2455 |
| 2455 | 2556 |
| 2456 | |
| 2457 | 2440 |
| 3002 | 2454 |

3031

| COMPONENT ID | NUMBER OF TRANSIT INPUT |
|---|---|
| 2403 | 1 |
| 2432 | 1 |
| 2433 | 1 |
| 2434 | 1 |
| 2435 | 1 |
| 2436 | 1 |
| 2437 | 1 |
| 2440 | 1 |
| 2452 | 1 |
| 2453 | 1 |
| 2454 | 1 |
| 2455 | 2 |
| 2456 | 1 |
| 2457 | 0 |
| 3002 | 1 |

3003

[ 2404,2405,2406,2407,2410,2422,2423,2424,2425
2426,2427 ]

OPERATOR NUMBER [10] 3010

TRAVERSE STACK

| COMPONENT ID | NUMBER OF TRANSIT INPUT |
|---|---|
| 2403 | 0 |
| 2432 | 0 |
| 2433 | 0 |
| 2434 | 0 |
| 2435 | 0 |
| 2436 | 0 |
| 2437 | 0 |
| 2440 | 0 |
| 2452 | 0 |
| 2453 | 0 |
| 2454 | 1 |
| 2455 | 1 |
| 2456 | 1 |
| 2457 | 0 |
| 3002 | 1 |

3010

OPERATOR NUMBER: 20

TRAVERSE STACK 3041: 2403

3100

| ID | EXECUTION ORDER |
|---|---|
| ⋮ | ⋮ |
| 2457 | 10 |
| 2440 | 11 |
| 2432 | 12 |
| 2433 | 13 |
| 2434 | 14 |
| 2435 | 15 |
| 2436 | 16 |
| 2437 | 17 |
| 2452 | 18 |
| 2453 | 19 |

3054

3031

| COMPONENT ID | NUMBER OF TRANSIT INPUT |
|---|---|
| 2403 | 0 |
| 2432 | 0 |
| 2433 | 0 |
| 2434 | 0 |
| 2435 | 0 |
| 2436 | 0 |
| 2437 | 0 |
| 2440 | 0 |
| 2452 | 0 |
| 2453 | 0 |
| 2454 | 1 |
| 2455 | 1 |
| 2456 | 1 |
| 2457 | 0 |
| 3002 | 0 |

3010

OPERATOR NUMBER: 21

TRAVERSE STACK 3041: 3002

3100

| ID | EXECUTION ORDER |
|---|---|
| ⋮ | ⋮ |
| 2457 | 10 |
| 2440 | 11 |
| 2432 | 12 |
| 2433 | 13 |
| 2434 | 14 |
| 2435 | 15 |
| 2436 | 16 |
| 2437 | 17 |
| 2452 | 18 |
| 2453 | 19 |
| 2403 | 20 |

| ID | OUTPUT DESTINATION OPERATOR ID |
|---|---|
| 2404 | 2405 |
| 2405 | 2406 |
| 2406 | 2407 |
| 2407 | 2422 |
| 2410 | 2404,2423 |
| 2422 | 2423 |
| 2423 | 2424 |
| 2424 | 2425 |
| 2425 | 2426 |
| 2426 | ~~2427~~ |
| 2427 | 2410 |

3022

| COMPONENT ID | NUMBER OF TRANSIT INPUT |
|---|---|
| 2404 | 2405 |
| 2405 | 2406 |
| 2406 | 2407 |
| 2407 | 2422 |
| 2410 | 2404,2423 |
| 2422 | 2423 |
| 2423 | 2424 |
| 2424 | 2425 |
| 2425 | 2426 |
| 2426 | |
| 2427 | 2410 |

3032

| COMPONENT ID | NUMBER OF TRANSIT INPUT |
|---|---|
| 2404 | 1 |
| 2405 | 1 |
| 2406 | 1 |
| 2407 | 1 |
| 2410 | 1 |
| 2422 | 1 |
| 2423 | 2 |
| 2424 | 1 |
| 2425 | 1 |
| 2426 | 1 |
| 2427 | 0 |

OPERATOR NUMBER 21 3010

TRAVERSE STACK 3042

2427

3055

3032

| COMPONENT ID | NUMBER OF TRANSIT INPUT |
|---|---|
| 2404 | 0 |
| 2405 | 0 |
| 2406 | 0 |
| 2407 | 0 |
| 2410 | 0 |
| 2422 | 0 |
| 2423 | 0 |
| 2424 | 0 |
| 2425 | 0 |
| 2426 | 0 |
| 2427 | 0 |

3010

OPERATOR NUMBER 32

TRAVERSE STACK 3042

3100

| ID | EXECUTION ORDER |
|---|---|
| ⋮ | ⋮ |
| 2427 | 21 |
| 2410 | 22 |
| 2404 | 23 |
| 2405 | 24 |
| 2406 | 25 |
| 2407 | 26 |
| 2422 | 27 |
| 2423 | 28 |
| 2424 | 29 |
| 2425 | 30 |
| 2426 | 31 |

Figure 30G:
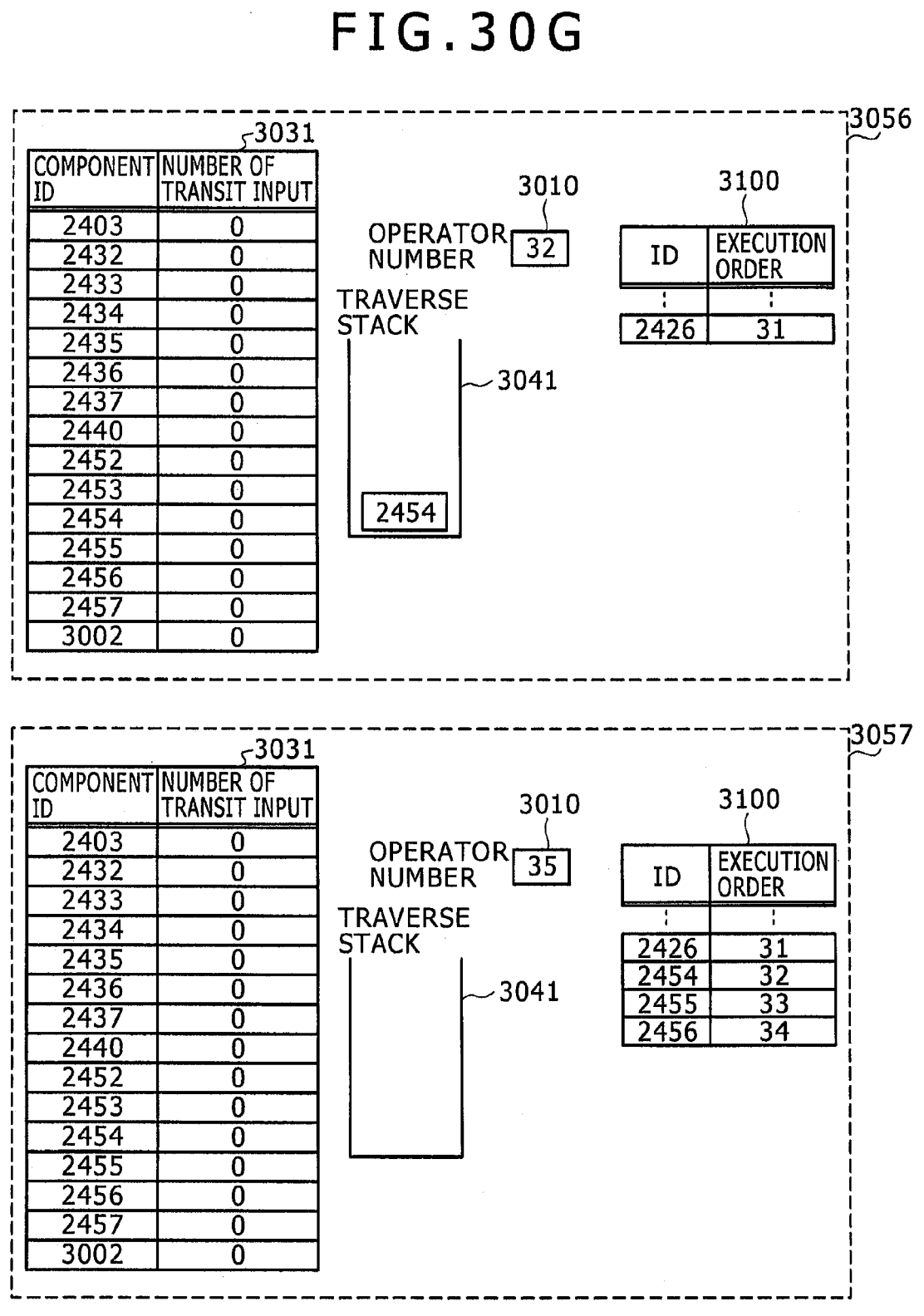

| COMPONENT ID | NUMBER OF TRANSIT INPUT |
|---|---|
| 2403 | 0 |
| 2432 | 0 |
| 2433 | 0 |
| 2434 | 0 |
| 2435 | 0 |
| 2436 | 0 |
| 2437 | 0 |
| 2440 | 0 |
| 2452 | 0 |
| 2453 | 0 |
| 2454 | 0 |
| 2455 | 0 |
| 2456 | 0 |
| 2457 | 0 |
| 3002 | 0 |

3010

OPERATOR NUMBER 32

TRAVERSE STACK

3041

2454

3100

| ID | EXECUTION ORDER |
|---|---|
| ⋮ | ⋮ |
| 2426 | 31 |

3057

3031

| COMPONENT ID | NUMBER OF TRANSIT INPUT |
|---|---|
| 2403 | 0 |
| 2432 | 0 |
| 2433 | 0 |
| 2434 | 0 |
| 2435 | 0 |
| 2436 | 0 |
| 2437 | 0 |
| 2440 | 0 |
| 2452 | 0 |
| 2453 | 0 |
| 2454 | 0 |
| 2455 | 0 |
| 2456 | 0 |
| 2457 | 0 |
| 3002 | 0 |

3010

OPERATOR NUMBER 35

TRAVERSE STACK

3041

3100

| ID | EXECUTION ORDER |
|---|---|
| ⋮ | ⋮ |
| 2426 | 31 |
| 2454 | 32 |
| 2455 | 33 |
| 2456 | 34 |

| ID | EXECUTION ORDER |
|---|---|
| 2430 | 1 |
| 2431 | 2 |
| 2450 | 3 |
| 2451 | 4 |
| 2400 | 5 |
| 2401 | 6 |
| 2402 | 7 |
| 2420 | 8 |
| 2421 | 9 |
| 2457 | 10 |
| 2440 | 11 |
| 2432 | 12 |
| 2433 | 13 |
| 2434 | 14 |
| 2435 | 15 |
| 2436 | 16 |
| 2437 | 17 |
| 2452 | 18 |
| 2453 | 19 |
| 2403 | 20 |
| 2427 | 21 |
| 2410 | 22 |
| 2404 | 23 |
| 2405 | 24 |
| 2406 | 25 |
| 2407 | 26 |
| 2422 | 27 |
| 2423 | 28 |
| 2424 | 29 |
| 2425 | 30 |
| 2426 | 31 |
| 2454 | 32 |
| 2455 | 33 |
| 2456 | 34 |

METHOD FOR PROCESSING STREAM DATA AND SYSTEM THEREOF

CLAIM OF PRIORITY

This is a continuation application of U.S. Ser. No. 12/542,887, filed Aug. 18, 2009 which claims priority from Japanese patent application JP2008-278306 filed on Oct. 29, 2008. The content of both applications is hereby incorporated by reference into this application.

BACKGROUND OF THE INVENTION

1. Field of the Invention

The present invention relates to a technology of processing continuously generated time series data, and in particular, to a technology of continuously executing general data processing including recursive processing in real time at a stable and low latency and at a high rate, in stream data processing.

2. Description of the Related Art

Stream data processing, which implements real-time processing of high rate data, which is based on the advancement in technology for analyzing information continuously generated at a high rate in real time, for example, information on automation of stock trading, enhancement of traffic information processing, and analysis of click stream, and instantly executing action, has been of interest. Since the stream data processing is a general-purpose middleware technology that can be applied to a variety of data processing, data in the real world can be reflected on business transactions in real time while responding to a sudden change in a business environment, which may not be sufficient for building a system for each item. The principle and implementation method of the stream data processing were disclosed in B. Babcock, S. Babu, M. Datar, R. Motwani and J. Widom, "Models and issues in data stream systems", in: Proc. of PODS 2002, pp. 1-16. (2002).

The stream data processing inputs streams that are a series of data of points on a time base and converts them into a relation that is a set of data having a survival period by a window operator. The relational operator on the relation is performed and thus, the relation is returned to a stream by a streaming operator and then output. The relation is a middle state in the stream data processing. Each data on the stream is called a stream tuple. Similar to a record of the relational database, the stream tuple has a time stamp as an attribute in addition to using a combination of a plurality of columns as a value. The stream tuples on the stream are input to the stream data processing in an ascending order of the time stamp.

For example, a series of six stream tuples with the time stamp of time t1 to t6 is considered. Values of each tuple include two columns of a character string id and an integer value val, each value being (a, 1), (a, 2), (b, 1), (a, 1), (a, 2), (b, 3). On the other hand, as the window operator, a row based window, which limits a maximum simultaneous survival number, is applied. Herein, the simultaneous survival number is limited to three. At this time, a first tuple is converted into data surviving during a period using time t1 as a start point and time t4 at which a fourth tuple arrives as an end point. A just end point is not included in the survival period. Other window operators include a time window that assumes the survival period as a prescribed time and a partition window that groups the stream tuple having the same values of specific columns and limits the maximum simultaneous survival number for each group.

As a relational operator on a relation that is a set of data defining the foregoing survival period, an example of applying a summing operator SUM for the column val is considered. In the relational operator in respect to the stream data processing, a set of intersection points when the relation of inputs and results for the operator is cut at any time on a time base is the same as the relation of inputs and results in the operator of the conventional relational database. For example, since the data values of the intersection points where the relation of the above example is cut at time t4 become {(a, 2), (b, 1), (a, 1)}, the data value of the intersection point where the relation, which is the result, is cut at the same time becomes {(4)}. The result processing of the set of the former data values by the summing operator SUM (val) of the conventional relational database becomes the set of the latter data values. A similar relation can be established at any time.

In any two relations, when the set of the data values of the intersection points throughout the entire time is the same, both relations are congruent to each other. The result of the relational operator in respects to the congruent relations is also congruent.

An example of applying an operator called IStream as the streaming operator to the result of the foregoing relational operator can be considered. When the set of the data values of the intersection points of the relation is increased and decreased at any time, the streaming operator assumes the time as the time stamp to output the increased and decreased data value as the stream tuple. The IStream outputs the increased data value. Other streaming operators include DStream that outputs the decreased data value and RStream that outputs the data values that survive at each prescribed time. The result of applying the operator according to the above example outputs the stream tuples of {(1)}, {(3)}, {(4)}, and {(6)} at time t1, t2, t3, and t6, respectively. At this time, the stream tuples are not output at time t4 and t5. This is because the intersection points cut at any time of time t3 to t6 of the result relation of the relational operator are {4} at all times, that is, a set having only one element and thus, the value thereof is unchanged. As such, since the streaming operator performs the processing based on the increase and decrease of the data value, it can guarantee that the same stream is generated from the congruent relations. However, if it does not wait until the increase and decrease of all the relations at any time is fixed, there is a limitation that the result tuple cannot be output at the time.

Next, a definition method of query data processing in the stream data processing and a general execution control method will be described. A mechanism used herein is based on a declarative language called a continuous query language (CQL). The grammar of the CQL takes a format of adding the mechanism of the window operator and the streaming operator to a query language SQL based on a relational algebra that is used for the relational database as a standard. The CQL is disclosed in A. Arasu, S. Babu and J. Widom, "The CQL Continuous Query Language: Semantic Foundations and Query Execution", (2005).

The following is an example of query definition.

```
REGISTER STREAM s1(id VARCHAR(30),val INT);
REGISTER STREAM s2(id VARCHAR(30),val INT);
REGISTER QUERY q
RSTREAM[30 SECOND] (
    SELECT s1. id AS id1, s2. id AS id2, s1. val
        FROM s1[RANGE 5 MINUTE], s2[ROWS 1]
        WHERE s1. val = s2. val
);
```

wherein, the two commands starting at "REGISTER STREAM" are commands that define input receiving streams from a data source.

A first command defines an input stream having a name called s1. Further, data received in the input stream has a column called id and val and the forms are defined as a character string form and an integer number form. A second command defines an input stream having a name called s2. The definition of the column is the same as the input stream s1. A third command is a command that defines a query. The third command defines a query having a name called q. In a portion surrounded by a parenthesis "("and")", the relational operator in respects to the relation is defined by the same grammar as the data processing language SQL in the relational database. The example specifies that the streams s1 and s2 are joined by the accordance of the value of the column val. A FROM-clause specifies a name of the input stream or a name of the query defined unlike. A portion continued to the stream name or the query name and surrounded by "[" and "]" is a mechanism that specifies the window operator. "s1 [RANGE 5 MINUTE]" described in the example specifies that the stream tuple of the input stream s1 is converted into data whose survival time is 5 minutes by the time window. Meanwhile, "s2[ROWS 1]" specifies that the stream tuple of the input stream s2 limits the simultaneous survival data to the latest one by the row based window. In addition to this, there are [PARTITION BY NUMBER OF COLUMN NAME LIST ROWS] that is a mechanism specifying the partition window and [NOW] that is a mechanism limiting a survival period to a logical fine time less than a real time, that is, only an instant. One positioned before the portion surrounded by the parenthesis "("and")" is a mechanism that specifies the streaming operator. "RSTREAM[30 SECOND]" described in the example specifies the use of the RStream and outputs the data value of the relation surviving at each 30 seconds as the stream tuple. In addition to this, there are "ISTREAM" that is a mechanism specifying the IStream and "DSTREAM" that is a mechanism specifying the DStream.

In the stream data processing, the query defined by the foregoing mechanism is converted into a data structure called an operator tree and is processed. The operator tree is a tree structure that connects between operators executing the element data processing by a data queue and implements the processing by transmitting and receiving data between the operators by a pipeline manner. Since the data on the relation has a survival period, two tuples, which indicate the survival starting and the survival ending for one data, are transmitted and received. The former is called a plus tuple and the latter is called a minus tuple.

In the processing of the operator tree, a time order guaranteeing control is performed to keep an order of the data processing as the time stamp. For example, like the join in the query example, the operator, which assumes two relations as an object, becomes the operator of two inputs on the operator tree. The operator should first process an earlier tuple by comparing the time stamps of the tuples that are input to left and right queues. In the meantime, if the arrival of the data from one of the two data sources is congested, the comparison cannot be performed and the processing of data from the other data source is also congested. This phenomenon is called a stall. In order to prevent the stall, a method of transmitting a heartbeat tuple for recognizing that time progresses from the operator that is the leaf (input) of the operator tree even while the data does not come from the data source is a widely recognized method in the stream data processing. The execution control method using the heartbeat is disclosed in T. Johnson, S. Muthukrishnan, V. Shkapenyuk and O. Spatscheck, "A Heartbeat Mechanism and its Application in Gigascope", in: Proc. of VLDB 2005, pp. 1079-1088.

Even in the operator that outputs the tuples by a binary operator as well as, time window or time limit ignition called RStream, the heartbeat tuple is still needed. For example, in the query example, the time window operator for the input stream s1 receives the plus tuple at 9:03'10, and there is a need to output the minus tuple after 5 minutes, that is, at a time of 9:08'10. If the data for the input stream s1 is congested, the minus tuple cannot be output. The heartbeat solves this problem. If the transmission interval of the heartbeat tuple is 1 minute, the minus tuple can be output by the heartbeat tuple of 9:09'00. This is similarly applied to the Rstream in the query example. Since the tuple is specified to be output at each 30 seconds, for example, the stream tuple of 9:02'30 is output by the arrival of the heartbeat tuple of 9:03'00. At this timing, the stream tuple of 9:03'00 cannot be output. As described above, when the streaming operator considers that unless all the tuples arrive at any given time (in this case, 9:03'00), there is a limitation in that the results cannot be output; since any tuple of 9:03'00 subsequent to the heartbeat tuple can also be reached, the output at this timing is not permitted.

In the stream data processing, there is data filter processing that processes the tuples received from only one input and then passes it as well as processing that needs the precision time control such as the binary operator and the time window and RStream. The heartbeat tuple performs a role of informing up to what time the processing can be executed on the operator, that is, a role of informing the executable time.

B. Babcock, S. Babu, M. Datar, R. Motwani, and D. Thomas, "Operator Scheduling in Data Stream Systems", (2005) discloses a simple round robin and a technology of first executing the operator that outputs the earliest executable tuple, as an algorithm that searches the executable operator from the operator tree based on the time information.

BRIEF SUMMARY OF THE INVENTION

FIGS. 3 and 4 show the problem of the execution method according to the heartbeat tuple in the related art when the stream data processing is applied to the low latency processing that is assumed as currently important processing.

FIG. 3 shows an example of simplifying a stock trading query. An input stream 'market' registered by a command 301 indicates stock price information, a column 'stock_id' indicates an issue ID, and 'price' indicates a stock price. An input stream 'resource_stream' registered by a command 302 indicates funds and a column val indicates a par value. An input stream 'stock_stream' registered by a command 303 indicates stock holdings, a 'column id' indicates an issue ID, num indicates the number of stocks, and 'price' indicates a buying price. A query 311 turns the stream 'resource stream' into a relation and keeps the latest amount of money. A query 314 turns the stream 'stock_stream' into a relation and keeps the latest stock holdings information on each issue. When a stock price of an issue is below a predetermined level, if he/she does not have the stocks and he/she has a purchase fund, a query 310 submits a buying order. A query 313 submits a selling order if the stock holdings is in a moving average higher than a buying price for 5 minutes. A query 316 merges the buying order and the selling order and submits the order at a timing interval of each 30 seconds.

FIG. 4 shows operator trees of the query shown in FIG. 3. Each of the operator trees 470, 471, 473, 474, and 476 is configured of operators 400 to 407, 410 to 411, 430 to 437, 440 to 441, and 460 to 463 and corresponds to the queries 310, 311, 313, 314, and 316. A heavy line between the operators indicates a queue that transmits and receives the streams and a thin line therebetween indicates a queue that transmits and receives the relations. Further, in FIG. 4, it is assumed that data flow from the bottom to the top.

The operators 400, 410, 430, and 440 are scan operators and transmit the heartbeat tuples at an interval of 1 minute therefrom. With regards to a timing of FIG. 4, a system timer, which is a watch owned by the stream data processing, indicates 9:15'00, wherein the heartbeat tuples are transmitted up to that time from each of the scan operators.

A first problem occurring due to the use of the heartbeat tuples is that the processing timing of a data tuple is limited to the transmission interval of a heartbeat tuple. For example, since a minus tuple 491 output from a time window operator 431 by a time stamp of 9:14'24 after 5 minutes of a plus tuple 490 should wait until the heartbeat tuple of 9:15'00 arrives, a delay in the processing timing of 36 seconds occurs. This means a timing delay at the time of submitting the selling order of the query 313. Meanwhile, even in the RStream operator 463, the output timing of the stream tuples 495 and 496 wait until a heartbeat tuple 497 arrives. A processing timing delay of 60 seconds and 30 seconds occurs in the stream tuples 495 and 496, respectively. Moreover, the tuples to be output at an interval of 30 seconds is in an operation state where two tuples are simultaneously output at an interval of 1 minute. This means the wrong timing at the time of submitting the buying and selling orders of the query 316. As described above, the time at half the heartbeat tuple transmission interval as an average is indicated as the latency.

A second problem is that a variance of a processing timing occurs between the operators. For example, a right input of a binary operator 462 progresses up to 9:13'30 that is a time stamp of a data tuple 493, while a left input of the binary operator 462 progresses up to 9:09'24 that is a time stamp of the data tuple 490. The deviation between two time stamps means that the processing of the tuple 490 is delayed by at least :04'6 that is a difference between both times. Further, until the processing of the left input progresses, the processing of the tuple 493 is congested. The deviation of the processing timing between the operators is also indicated as the latency.

A third problem is an overhead of the processing cost of a heartbeat tuple. Unlike a data tuple, since the heartbeat tuple is not in the actual data, the processing is originally a useless cost. In particular, if the transmission interval of the heartbeat becomes narrow in order to solve the first problem, there is a probability that the load on the CPU is increased or a reduction of throughput occurs.

Accordingly, when intending to solve the problems without using heartbeat tuples, any operators should specify what they execute next each time any operator completes the processing.

In addition, in order to use the analysis results of the stream data for business in real time, there is a need to determine the subsequent action by rapidly reflecting the action with respect to the change in the input, etc., from the outside as well as the change in the internal situation including the data processing results in the stream data processing system accordingly. FIGS. 5 and 6 show that it is difficult to implement the processing using the execution method according to the heartbeat tuple of the related art.

FIG. 5 shows a query reflecting the change in funds according to the purchase in the query of FIG. 3. The difference from the query of FIG. 3 is that costs accompanied by the buying order by a query 512 are reduced from funds to reflect the latest amount of money as the input to the query 311. Further, a stream 'initial_resource', which inputs initial funds, is defined by a command 502 and is merged with the change in funds by a query 512. Thereby, the information on the amount of money required for the buying order is changed based on the results of the buying order. As such, in order to generate the results of any query, a query using the results of the query itself is called a recursive query.

FIG. 6 shows the operator tree of the query. Each of the operator trees 670, 671, 672, and 674 is configured of operators 600 to 607, 610, 620 to 626, and 640 to 641 and corresponds to queries 310, 311, 512, and 314. The data tuples or the heartbeat tuples are output from the scan operators 600, 620, and 640 in the operator trees. However, these tuples become congested due to binary operators 605, 625, and 604, respectively. The reason is that other inputs in these operators exist on a path of a closed path formed by operators 610-604-605-606-607-622-623-624-625-626-610 and that the tuples do not flow on the loop any more.

The operator tree of the recursive query should have the loop as described above. In the execution control method using the heartbeat tuple according to the related art, since the processing can be progressed only when the tuples of both inputs should be prepared in the binary operator and the time stamps of both tuples should be compared, the recursive query cannot be executed.

Moreover, as described above, since the streaming operator has a limitation that if all the tuples of any time does not arrive, the results cannot be output, the recursive query cannot be executed as it is. FIG. 7 shows this problem.

FIG. 7 shows a value of a tuple, a time stamp, and a survival period when executing the query shown in FIG. 5. For the processing of the operators 602, 604, and 625, FIG. 7 does not show it due to its complexity. When the stream tuple having a value of 3000000 is input to 'resource_stream' at time to, it is converted into a 'resource' relation that indicates the latest amount of money by a row based window operator 610. Herein, if the stream tuple is input to the input stream 'market' at time t1, it is converted into a relation having a survival period of a logical fine time by the window operator 601. Thereby, the relation 'resource' is combined by a join operator 605 and is output as a tuple of a stream 'buy_event', which indicates the buying order, via a projection operator 606 and a streaming operator 607. The tuple is combined with the relation 'resource' via operators 622, 623, and 624 and is output as a relation that indicates a new amount of money 2520000 reflecting the buying order. The relation is added to the a stream 'resource-stream' as the tuple of time t1 by a streaming operator 626.

However, it does not actually operate like the above-mentioned explanation, and the processing deadlocks. The reason is that the output of the streaming operator 607 is returned to its own input. It is similarly applied to the streaming operator 626. However, if the deadlock does not occur, the value of 2520000 becomes a new amount of money at time t1 and is joined with the stream 'market' again, and the processing goes round again and the entirely same buying order is submitted in the processing, such that it is updated to the amount of money of 2040000. The buying order and the decrease in funds will excessively occur like joining with the stream 'market' again.

As described above, the recursive query cannot be executed due to the problem of the execution control method by the heartbeat tuple and the limitation of the streaming operator.

It is an object of the present invention to provide a method for processing stream data using an execution control method capable of solving the problem of latency in an execution control method according to the related art and a system thereof.

It is another object of the present invention to provide a method for processing stream data using an execution control method capable of solving a problem in that an execution control method according to the related art cannot implement the recursive query and avoiding a limitation of a streaming operator and a system thereof.

Representative ones of embodiments disclosed in the specification will be briefly described below.

At steps prior to executing queries, a single operator graph that connects operator trees of a plurality of queries is formed and an external ignition operator that inputs tuples from the outside of the operator graph and an internal ignition operator called a time window and RStream are extracted. In this specification, both the external ignition operator and the internal ignition operator are called an ignition operator.

And, an entire order of all sets of operators, which belong to an operator graph, is defined. This order is assumed to be defined so that the operators of an output side in the input and output relation between the operators become larger than those of the input side. This order is called an operator execution order in this specification.

Moreover, in the query execution, the time stamp of the tuple to be output when each ignition operator will be executed next time is called the ignition time of the ignition operator.

At this time, the present invention controls the query execution by a loop of the following processing.

(1) The operators of the earliest ignition time are selected in the ignition operator group. The selected operator is called an execution operator. Further, the ignition time is called execution time.

(2) The operators are sequentially executed up to an exit of the operator graph in an ascending order of the operator execution order from the execution operator that is selected in (1) as a start point.

(3) The processing of all the tuples assumed as the time stamp is executed at the execution time and returned to (1) if there are no tuples at the corresponding ignition time from the top of the operator graph.

Moreover, since the operator execution order cannot be defined when the operator graph includes the loop, the present invention decomposes the graph into strongly connected components. The strongly connected components are a set of nodes having a relation that reach and match each other in a directional graph. As a result, since the loop does not exist between the components, the execution order between components can be determined. In addition, an algorithm that determines the operator execution order in the component is provided.

Among the embodiments disclosed in the specification, effects obtained by representative embodiments will be briefly described below.

Since the processing of all the operators is completed at each execution time and the execution progresses, the executable time of each operator in each loop of the processing is naturally determined, such that the heartbeat is unnecessary. Therefore, the problem of the latency in the execution control method according to the related art is solved. In other words, (1) There are no factors that limit the latency.

(2) Since there is no deviation in the processing timing among operators, the latency due to the indeterminancy of the execution order of the operators does not occur.

(3) There is no overhead that processes the useless tuples other than the data tuples.

Moreover, regarding the executablity of a recursive query, since the operator tree has the loop, in the execution control using the heartbeat of the related art, it cannot be implemented, but since the heartbeat becomes unnecessary in the present invention, the execution control can be implemented.

BRIEF DESCRIPTION OF THE DRAWINGS

FIG. 3 is a diagram showing one example of data processing definition in a stream data processing;

FIG. 5 is a diagram showing one example of the data processing definition in the stream data processing;

FIG. 10 is an explanatory diagram of a data structure used for determining an operator execution order according to the first embodiment;

FIG. 13B is an explanatory diagram of a data structure used in the flow chart of FIG. 12;

FIG. 13C is an explanatory diagram of a data structure used in the flow chart of FIG. 12;

FIG. 14 is a table showing the operator execution order determined in the first embodiment;

FIG. 20 is a diagram showing an example of the data processing definition in the stream data processing according to the second embodiment;

FIG. 23A is a diagram showing an example of the data processing definition in the stream data processing according to a third embodiment;

FIG. 23B is a diagram showing an example of the data processing definition in the stream data processing according to the third embodiment example;

FIG. 29 is an explanatory diagram of the data structure used in the flow charts of FIGS. 28A and 28B;

FIG. 30A is an explanatory diagram of the data structure used in the flow charts of FIGS. 28A and 28B;

FIG. 30B is an explanatory diagram of the data structure used in the flow charts of FIGS. 28A and 28B;

FIG. 30C is an explanatory diagram of the data structure used in the flow charts of FIGS. 28A and 28B;

FIG. 30E is an explanatory diagram of the data structure used in the flow charts of FIGS. 28A and 28B;

FIG. 30F is an explanatory diagram of the data structure used in the flow charts of FIGS. 28A and 28B;

FIG. 30G is an explanatory diagram of the data structure used in the flow charts of FIGS. 28A and 28B;

FIG. 31 is a table showing the operator execution order determined according to the third embodiment.

DETAILED DESCRIPTION OF THE INVENTION

Hereinafter, preferred embodiments of the present invention will be described in detail with reference to the accompanying drawings. Further, in all the drawings for explaining the embodiments, like numerals basically refer to like components and the repetitive description thereof will be omitted.

Figure 4:
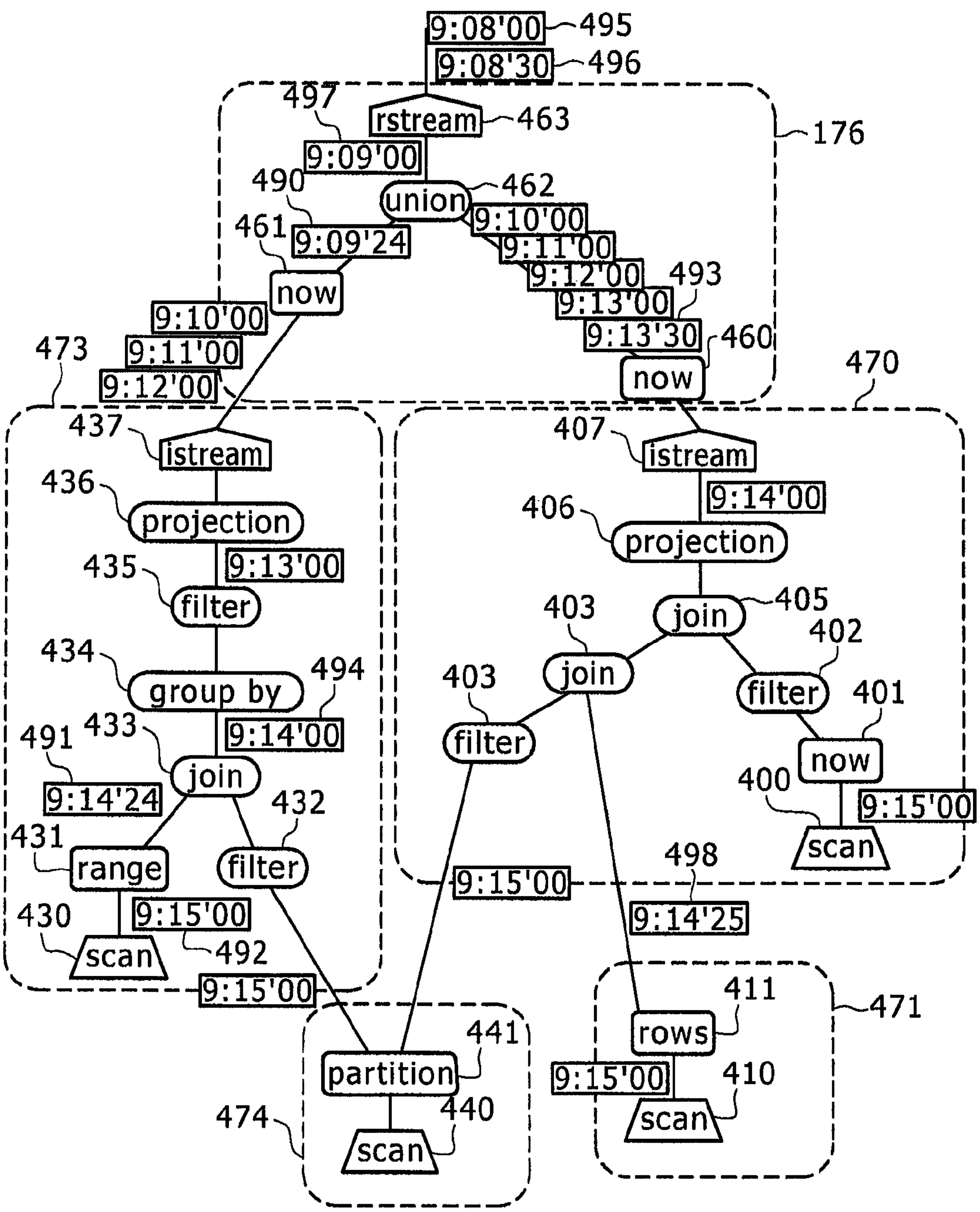
FIG. 4 is an explanatory diagram showing an execution method according to the related art of the data processing definition of FIG. 3.
Figure 6:
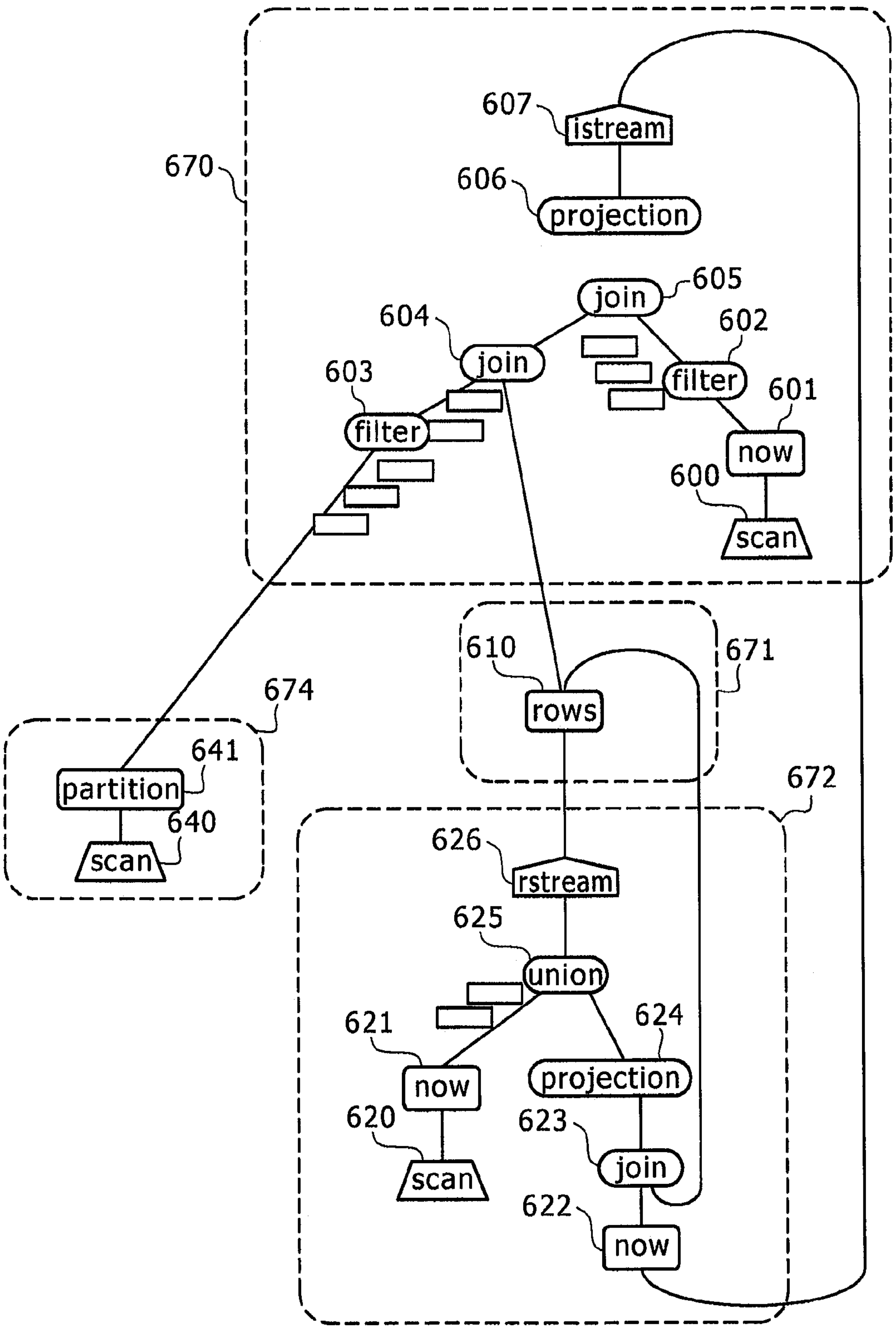
FIG. 6 is an explanatory diagram showing a problem in implementing the data processing definition of FIG. 5.
Figure 8A:
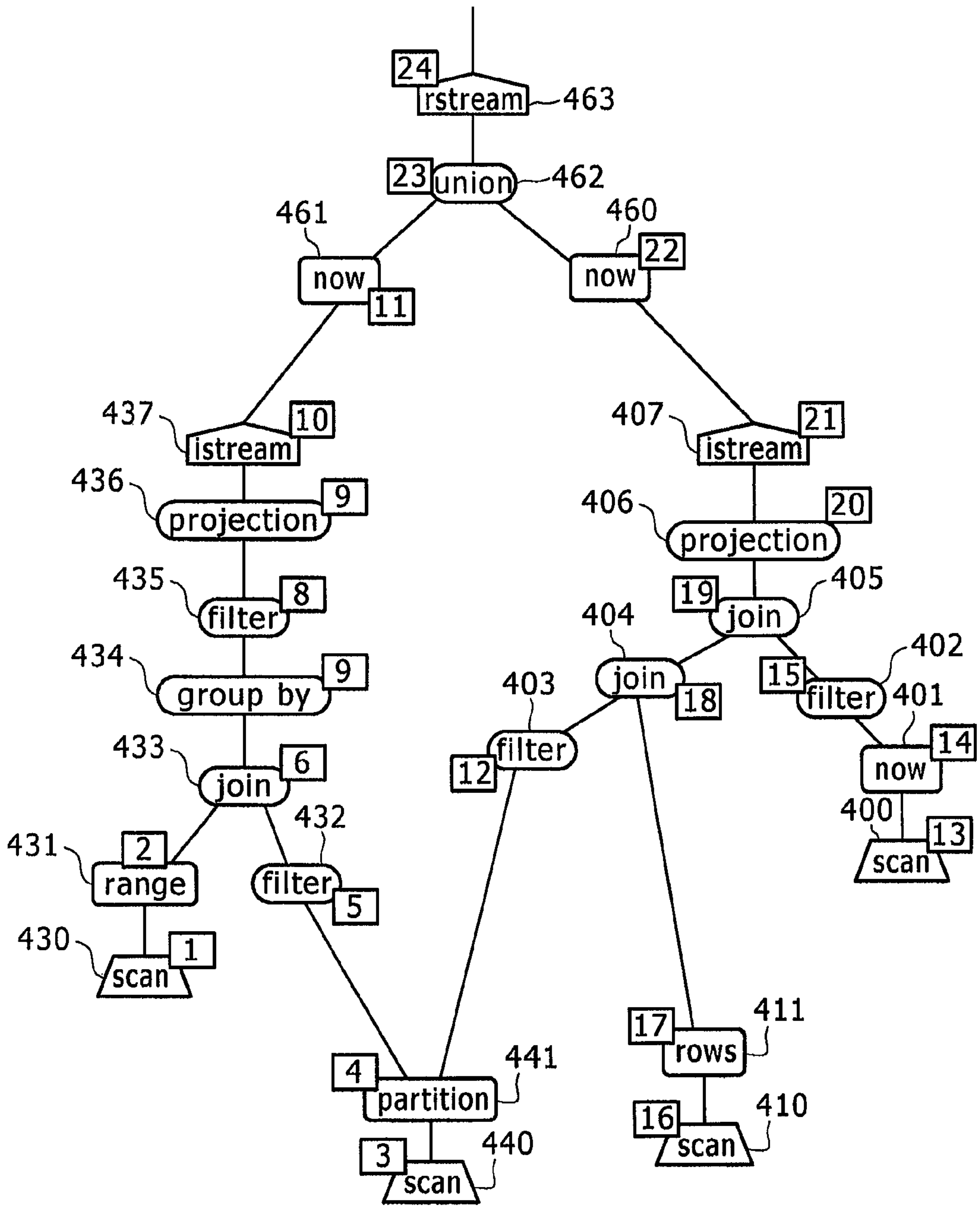
FIG. 8A is an explanatory diagram of the implementation method of the data processing definition of FIG. 3 according to the present invention.

First, a basic principle of the present invention will be described with reference to FIGS. 8A to 8C. FIG. 8A assigns figures surrounded by a square frame to each operator in an operator tree of FIG. 4. This value indicates an execution order of operators as will be described below. Unlike FIG. 4, FIG. 8A defines the execution order on a graph by catching a big single operator graph by disregarding the discriminating of the queries. The execution order is a natural number and meets the requirement that values assigned to the operators of an output side are larger than values assigned to the operators of an input side.

Figure 8B:
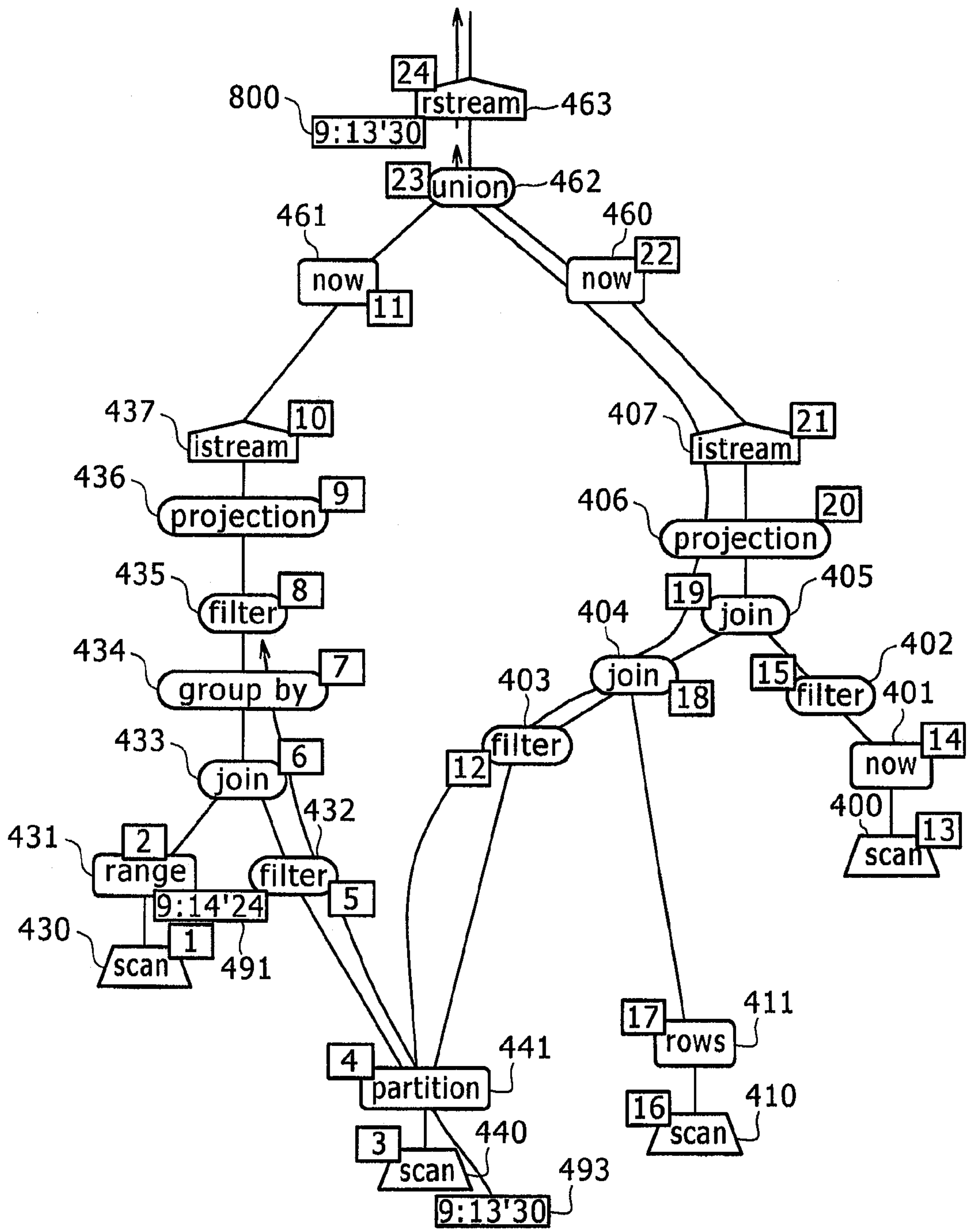
FIG. 8B is an explanatory diagram of the implementation method of the data processing definition of FIG. 3 according to the present invention.

FIG. 8B shows an execution state when a system time becomes 9:13'30. If a stream tuple 493 arrives at a scan operator 440 just in time, the time stamp is defined to be 9:13'30. At the same time, a time window 431 keeps a data tuple 491 of a time stamp 9:14'24 and a streaming operator 463 keeps a data tuple 800 of a time stamp 9:13'30. The operator 440 is an external ignition operator, wherein ignition time becomes 9:13'30. Operators 431 and 463 are an internal ignition operator, wherein ignition times become 9:14'24 and 9:13'30 each. Since the earliest value in these ignition times becomes an execution time, in this case, the ignition time becomes 9:13'30 and ignition operators 440 and 463 having an ignition time that is identical with the above ignition time become an execution operator. The operator group is executed as a start point according to the operator execution order in a square frame. This example assumes the operator 440 as a start point and progresses processing along a path of an arrow of a thick curved line. Herein, it is assumed that data is filtered in an operator 435 and the processing of operators 436, 437, and 461 is not executed.

During the processing assuming the execution operator 440 as a start point, since it also includes another execution operator 463, the processing assuming the operator 463 as a start point is not executed separately. Herein, the processing assuming the execution operator 463 as a start point cannot be executed until the processing assuming the execution operator 440 as a start point is executed. The reason is that the operator 463 is a streaming operator and if all operators at 9:13'30 that is the execution time are not provided to the input, the tuples cannot be output. In order to guarantee the limitation of the streaming operator, the operator execution order should be determined to meet the above-mentioned requirement.

Figure 8C:
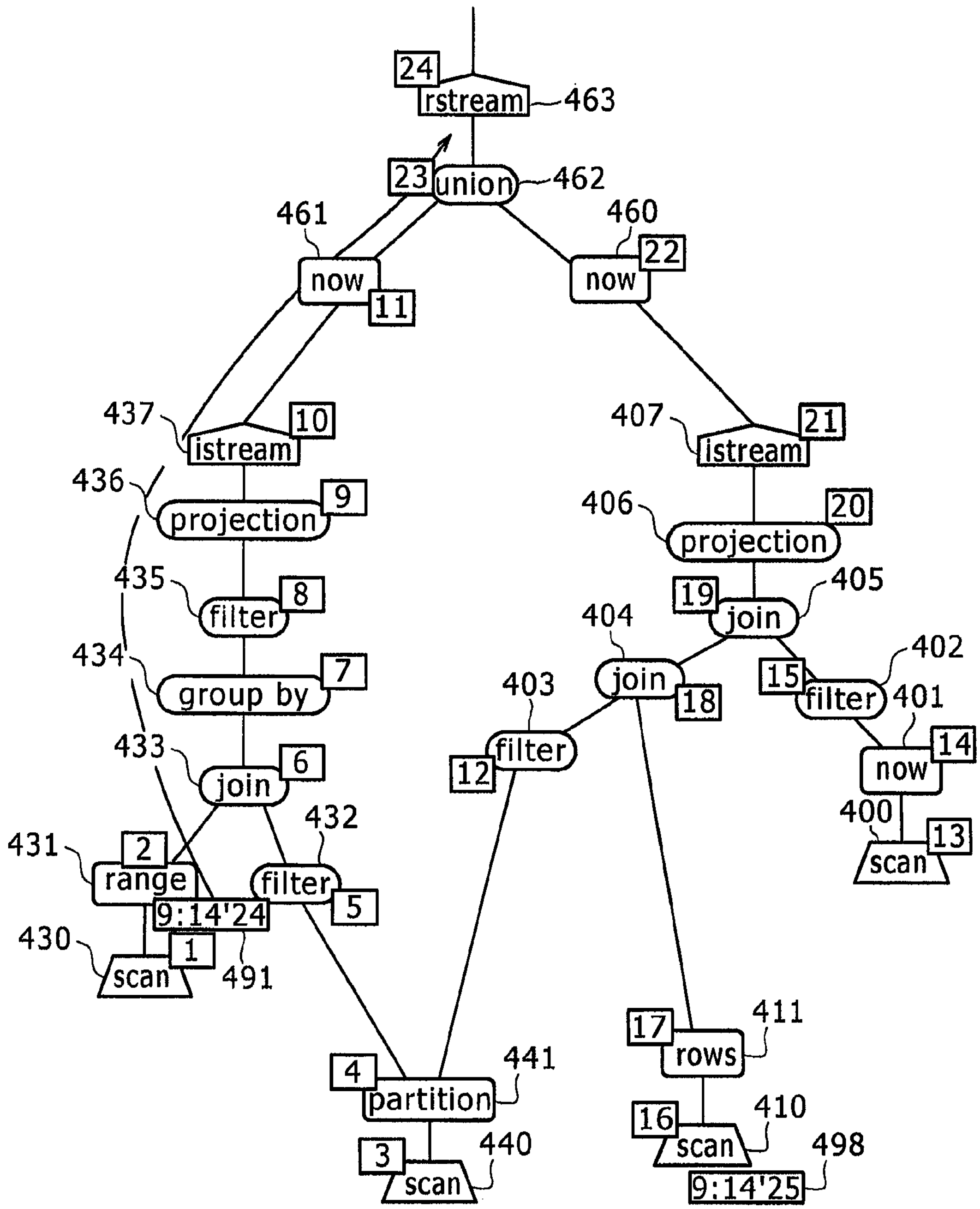
FIG. 8C is an explanatory diagram of the implementation method of the data processing definition of FIG. 3 according to the present invention.

FIG. 8C shows the execution state when the system time becomes 9:14'26. A stream tuple 498 of a time stamp 9:14'25 arrives at a scan operator 410. At this time, since the ignition time of the external ignition operator 410 is 9:14'25 and the ignition time of the internal ignition operator 431 is 9:14'24, 9:14'24 that is the earliest ignition time among those becomes the execution time and the operator 431 becomes the execution operator, such that the processing assuming the operator as a start point progresses along a path of an arrow of a thick curved line.

As described above, all the processing of the operator to be executed at the time is completed simultaneously with the change in the system time.

A basic configuration of a stream data processing system for implementing the present invention will be described below with reference to FIGS. 1 and 2.

Figure 1:
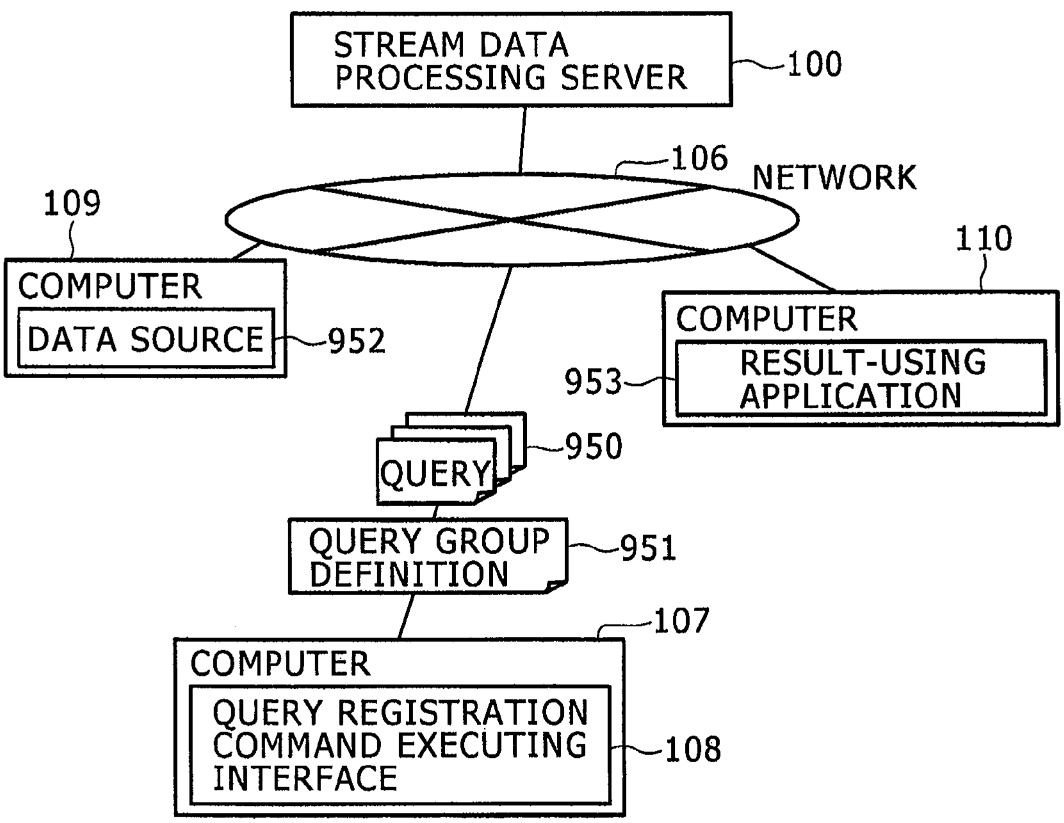
FIG. 1 is a diagram showing one example of a computer environment where a stream data processing server is operated.
Figure 2:
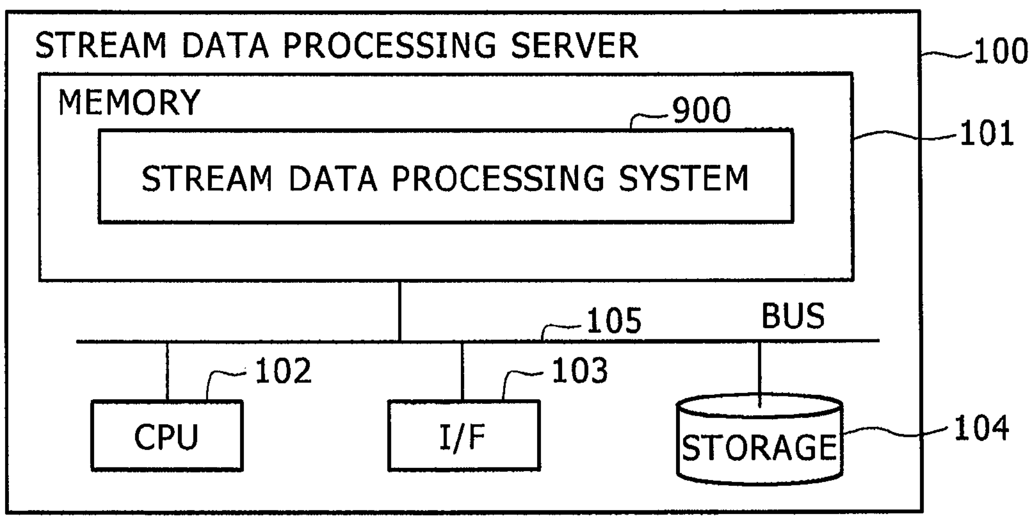
FIG. 2 is a diagram showing one example of a configuration of the stream data processing server.

As shown in FIG. 1, a stream data processing server 100 and computers 107, 109, and 110 are connected to a network 106. As shown in FIG. 2, the stream data processing server 100 is a computer constituted by a memory 101 that is a memory unit, a central processing unit (CPU) 102 that is a processing unit, a network I/F 103, a storage 104 that is a memory unit, and a bus 105 that connects all of them. A stream data processing system 900, which defines a logic operation of the stream data processing, is disposed on the memory 101. The stream data processing system 900 is an execution image that can be interpreted and executed by the CPU 102 as will be described below. The stream data processing server 100 is connected to the external network 106 through the network I/F 103.

If the stream data processing server 100 receives a query 950 and query group definition 951, which are defined by a user, through a query registration command executing interface 108 operated on the computer 107 that is connected to the network 106, the stream data processing system 900 configures operator trees therein, the operator trees being capable of executing the stream data processing according to the definition. Thereafter, if the stream data processing server 100 receives data transmitted by a data source 952 operated on the computer 109 connected to the network 106, it processes the data according to the operator trees to generate result data. The result data is transmitted to a result-using application 953 operated on the computer 110 connected to the network 106. The storage 104 stores the executable binary code of the stream data processing system 900 and the query 950 and the query group definition 951, which are received once by the stream data processing system 900. The stream data processing system 900 loads the definition from the storage 104 at the time of starting and can also configure the operator trees.

First Embodiment

Next, a stream data processing system according to a first embodiment will be described below with reference to FIGS. 9 to 18.

Figure 9:
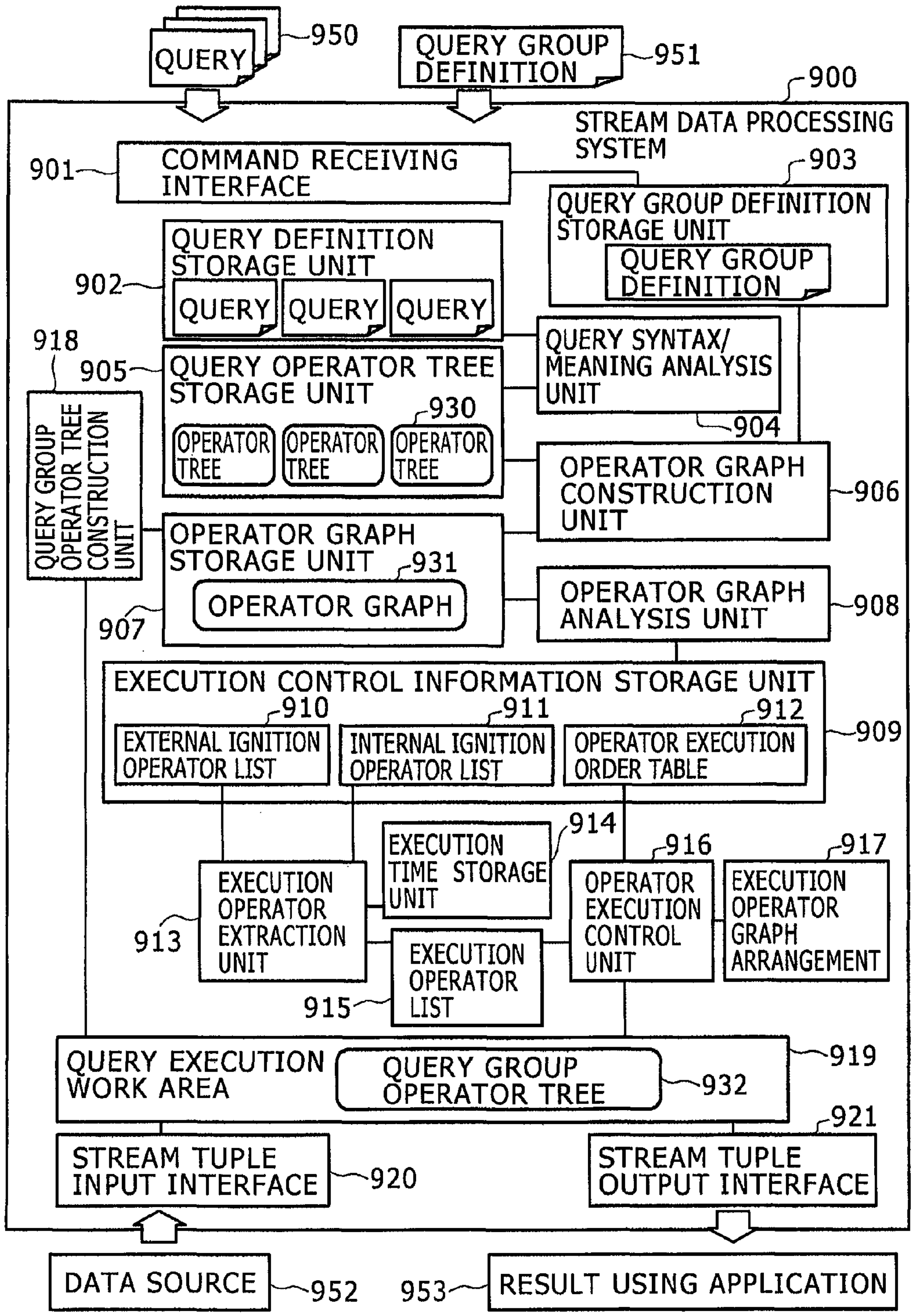
FIG. 9 is a block diagram showing a configuration example of a stream data processing system according to a first embodiment.

FIG. 9 shows in detail the stream data processing system 900 according to the first embodiment. The stream data processing system 900 is interpreted and executed by the CPU 102 shown in FIG. 2. In the stream data processing system 900, a query definition storage unit 902, a query group definition storage unit 903, a query operator tree storage unit 905, an operator graph storage unit 907, an execution control information storage unit 909, an execution time storage unit 914, an execution operator list 915, an execution operator graph arrangement 917, and a query execution work area 919 are properly formed on the memory 101 or storage 104 that is a memory unit. Each function of a query syntax/meaning analysis unit 904, an operator graph construction unit 906, an operator graph analysis unit 908, an execution operator extraction unit 913, an operator execution control unit 916, and a query group operator tree construction unit 918 is executed by the CPU 102. A command receiving interface 901, a stream tuple input interface 920, and a stream tuple output interface 921 correspond to the network I/F 103.

Herein, the stream data processing system 900 receives the queries 950 defined by the user through the command receiving interface 901. The information is stored in the query definition storage unit 902. Meanwhile, the query group definition 951 is also provided by the user, the query group definition 951 defining which query among the queries 950 is an object of the execution control method of the system. The definition is stored in the query group definition storage unit 903. In addition, the query group definition can be defined in a separate form rather than explicitly provided by the user. For example, the query group definition can have a variation that implicitly assumes a set of a plurality of queries defined in the same file as a query group, assumes a plurality of queries configuring a recursive query as a query group, assumes a query, in which an execution thread is divided, as a mutually sparse query group, and assumes a portion surrounded by annotation in defining the query as a query group.

Each query definition is converted into an operator tree 930 by the query syntax and meaning analysis unit 904, which is then stored in the query operator tree storage unit 905. The operator graph construction unit 906 refers to the query group definition 951 stored in the query group definition storage unit 903 to form a single operator graph 931, which connects the operator tree groups, from the operator trees of the query group, forming one group, and stores it in the operator graph storage unit 907.

The operator graph analysis unit 908 prepares an external ignition operator list 910, an internal ignition operator list 911, and an operator execution order table 912 based on the input and output relation between the operators in the operator graph 931 and the kind of operator and stores them in the execution control information storage unit 909. The query group operator tree construction unit 918 constructs a query group operator tree 932 that is a single operator tree assuming all the operators belonging to the query group as an element, based on the operator tree group belonging to the query group and the operator graph, and stores it in the query execution work area 919.

When executing the query, the execution operator extraction unit 913 refers to the external ignition operator list 910 and the internal ignition operator list 911 configuring the ignition operator list to obtain an execution time and an execution operator group from the ignition time of the ignition operator in the query group operator tree 932 and stores them in the execution time storage unit 914 and the execution operator list 915, respectively. Subsequently, the operator execution control unit 916 refers to the execution time storage unit 914, the execution operator list 915, and the operator execution order table 912, uses the execution operator graph arrangement 917 as the work area, and controls the execution of the operator of the query group operator tree 932. As such, the processing of the execution operator extraction unit 913 and the operator execution control unit 916 are alternately executed, thereby executing the query.

Data from an external data source 952 of the stream data processing system 900 is received in the stream tuple input interface 920 and passes to the query execution work area 919. Meanwhile, the execution results of the query are transmitted to the result-using application 953 of the outside of the stream data processing system 900 through the stream tuple output interface 921 from the query execution work area 919.

Next, a method for determining the operator execution order in the first embodiment using the operator trees shown in FIGS. 8A to 8C as an example will be described with reference to FIGS. 10 to 14.

An inter-operator input and output relational table 1000 shown in FIG. 10 indicates the correspondence of each operator and an operator (there may be plural) that becomes the output destination thereof, in the operator trees shown FIGS. 8A to 8C. It can be obtained from the operator graph 931 of the operator graph storage unit 907.

Figure 11:
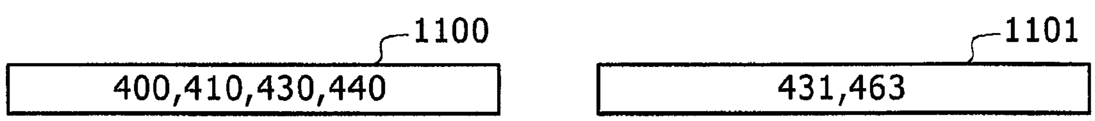
FIG. 11 is an explanatory diagram of a data structure used for determining the operator execution order according to the first embodiment.

FIG. 11 shows an ID of the ignition operator as a list in the operator tree shown in FIGS. 8A to 8C. Reference numeral 1100 indicates the external ignition operator list and reference numeral 1101 is the internal ignition operator list.

Figure 12:
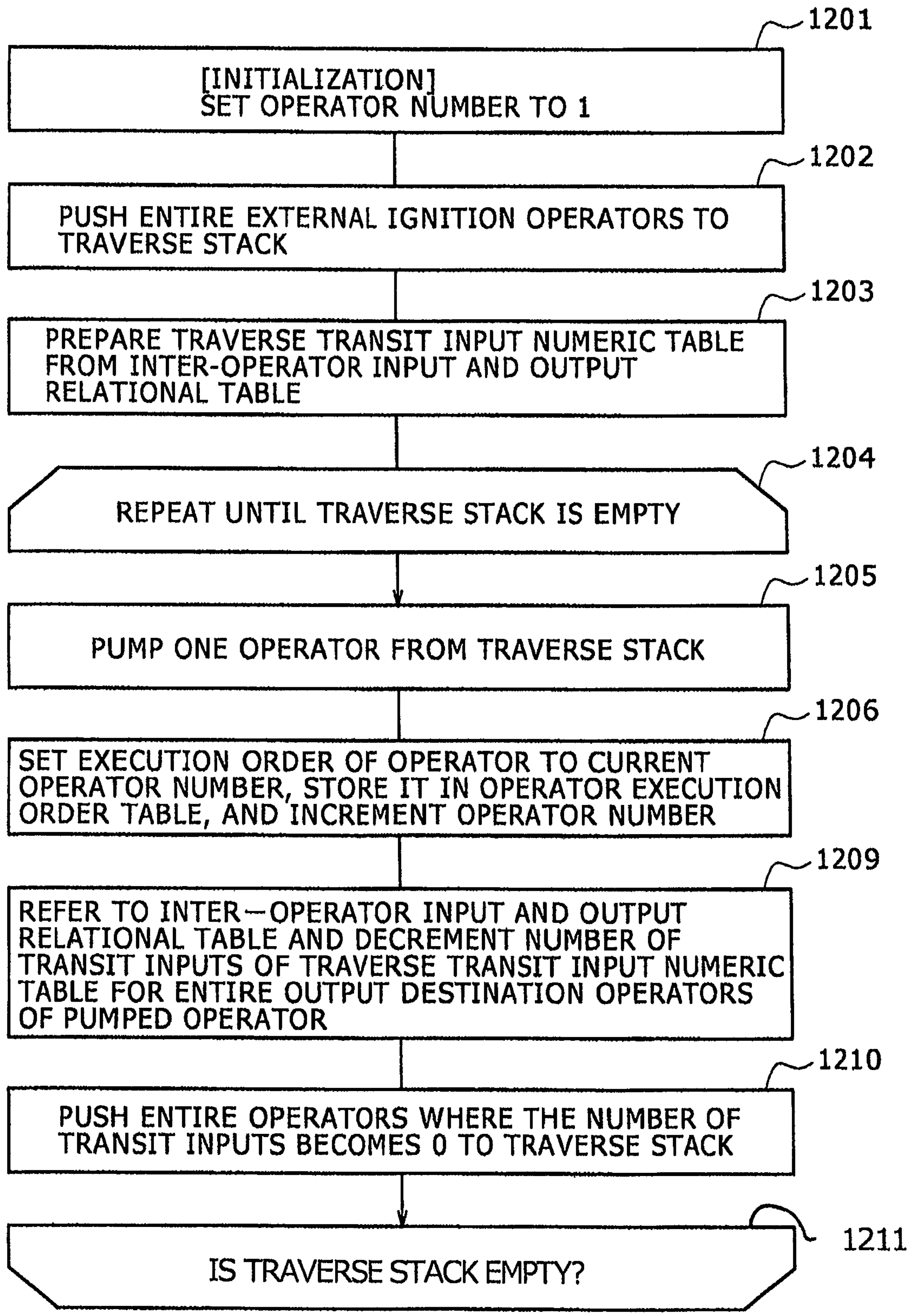
FIG. 12 is a diagram showing a flow chart used for determining the operator execution order according to the first embodiment.
Figure 13A:
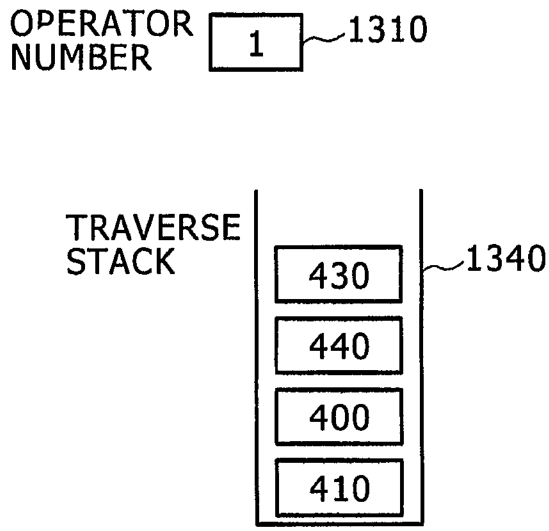
FIG. 13A is an explanatory diagram of a data structure used in the flow chart of FIG. 12.

FIG. 12 is a flow chart of an algorithm that determines the operator execution order by the operator graph analysis unit 908. Further, FIG. 13A shows a data structure used in the flow chart.

First, an operator number is initialized to 1 at step 1201 of FIG. 12. This value is stored in an operator number storage area 1310. This value is incremented each time the execution order of the operators is determined in the process of traversing the operator graph during the flow processing. All the external ignition operators are pushed to a traverse stack 1340 at continued step 1202. The traverse stack 1340 for the operator trees shown in FIGS. 8A to 8C refers to the external ignition operator list 1100, such that it is initialized as shown in FIG. 13A. A traverse transit input numeric table is initialized from the inter-operator input and output relational table at continued step 1203. The transit input numeric table for the operator trees shown in FIGS. 8A to 8C can be obtained as a frequency that each operator appears in a queue of the output destination operator ID of the inter-operator input and output relational table 1000. The results are initialized as shown in table 1330. In the process of traversing the operator during the flow processing, if the traverse arrives at an operator that becomes an input of any operator, the number of transit inputs of the former operator is decremented.

A loop of continued step 1204 is repeated until the traverse stack 1340 is empty. First, at step 1205, one operator is popped by the traverse stack 1340. At continued step 1206, the execution order of the operator is set to a value that is stored in the operator number storage area 1310 at this time and is stored in the operator execution order table 912. The operator number stored in the area 1310 is incremented and is stored in the operator number storage area 1310 again. At continued step 1209, the operator that becomes the output destination of the popped operator is drawn from the inter-operator input and output relational table 1000 of FIG. 10 and the number of transit inputs of all the output destination operators is decremented in a traverse transit input numeric table 1330. At this time, if there is an operator where the number of transit inputs becomes 0, it is pushed to the traverse stack at continued step 1210. The processing is repeated until the traverse stack is empty at step 1211.

FIGS. 13B and 13C show the state transition of the data structure in the flow processing of FIG. 12. A state 1350 of FIG. 13B indicates a state that pops the operator 430 from the traverse stack 1340 and then traverses up to the operator 431, and executes the processing until the number of transit inputs of the operator 433 that becomes the output designation of the operator is decremented in step 1209. In step 1209, since the number of transit inputs of the output destination 433 does not become 0, it is not accumulated in the traverse stack. An operator execution order table 1400 becomes in a state that determines the execution order of the operators 430 and 431. The operator number is incremented up to 3.

A state 1351 of FIG. 13B indicates a state that pops the operator 440 from the traverse stack 1340 and then traverses up to the operator 432 and executes the processing until since the number of transit inputs of the operator 433 that becomes the output destination of the operator is decremented to make the value to be 0, it is accumulated in step 1210 in the traverse stack 1340. In this processing, since the number of transit inputs of the operator 403 also becomes 0, it is accumulated in the traverse stack 1340. The operator execution order table 1400 is determined up to the execution order 5 and the operator number is incremented up to six.

A state 1352 of FIG. 13C indicates a state that pops the operator 433 from the traverse stack 1340 and then traverses up to the operator 461 and executes the processing until the number of transit inputs of the operator 462 that becomes the output designation of the operator is decremented in step 1209. The operator execution order table 1400 is determined up to the execution order 11.

A state 1353 of FIG. 13C indicates a state that pops the operator 403 from the traverse stack 1340 and since the number of transit inputs of the operator 404 that becomes the output designation of the operator does not become 0, subsequently, pops the operator 400 from the traverse stack 1340 and then traverses up to the operator 402, and executes the processing until the number of transit inputs of the operator 405 that becomes the output destination of the operator is decremented in step 1209. The operator execution order table 1400 is determined up to the execution order 15. In this state, the processing after popping the operator 410 that remains in the traverse stack 1304 is continuously traversed since all the number of transit inputs of the traverse transit input numeric table 1330 become 1.

The table 1400 of FIG. 14 is an operator execution order table (corresponding to the table 912 of FIG. 9) that is finally determined by an algorithm with respect to the example of the operator trees shown in FIGS. 8A to 8C and the execution order is the same as the figures surrounded by a square frame in FIGS. 8A to 8C.

Figure 15:
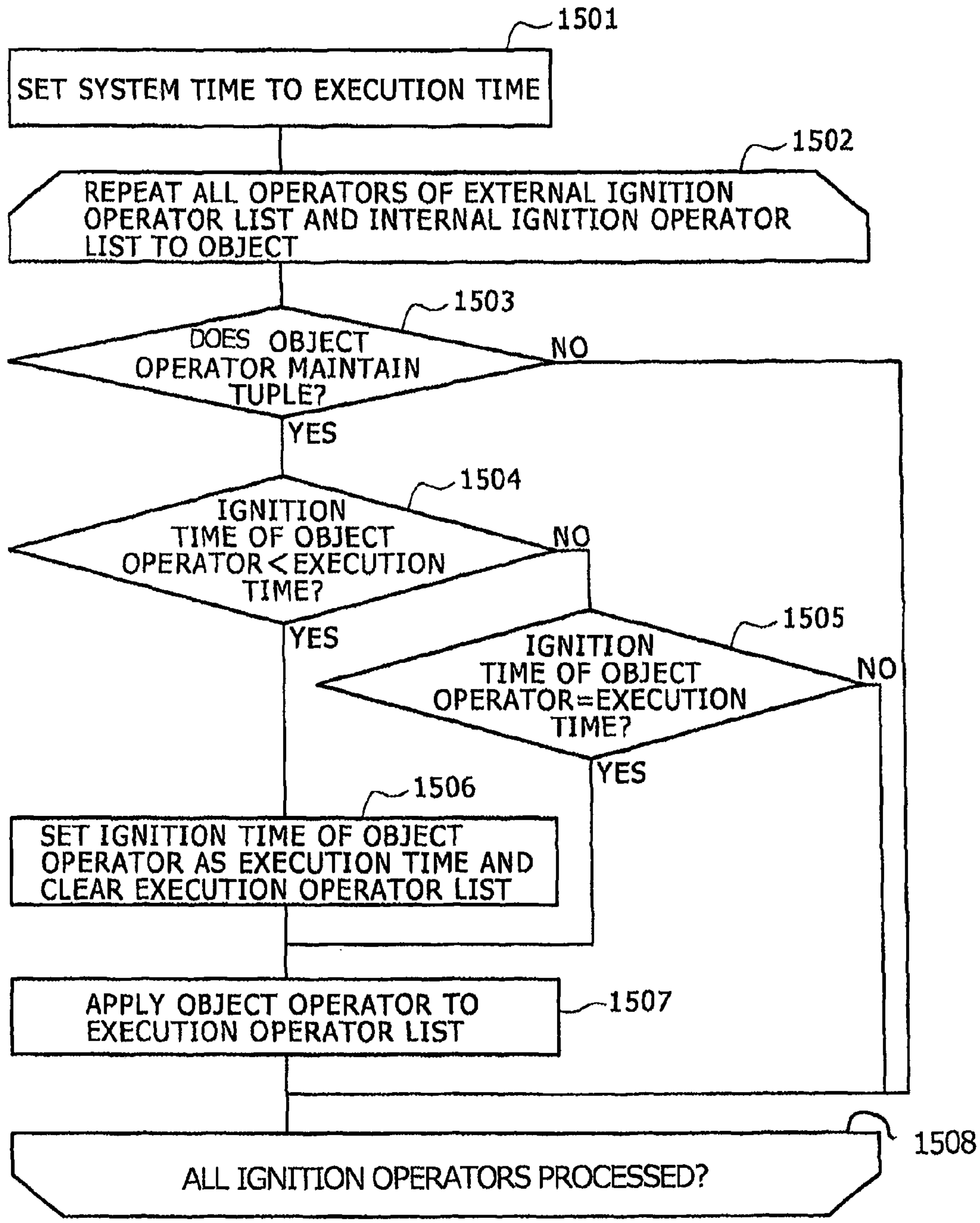
FIG. 15 is a diagram showing a flow chart of the operator execution control according to the first embodiment.

Next, FIG. 15 is a flow chart for explaining an operator of the execution operator extraction unit 913 of FIG. 9. First, at step 1501, the execution time is initialized to the system time. A loop of continued step 1502 repeats each operator of the external ignition operator list 910 and the internal ignition operator list 911 as an object and processes all the ignition operators.

First, at step 1503, it checks whether the object operator in the loop keeps the tuple to be output. If not, the processing of the object operator ends. If so, the time stamp of the tuple to be output is assumed as the ignition time and subsequent steps 1504 and 1505 compare the execution time at this timing with before and after the ignition time. When the ignition time is delayed more than the execution time, the processing of the object operator ends. When the ignition time and the execution time are at the same time, at step 1507, the object operator is added to the execution operator list 915 at this timing. When the ignition time is earlier than the execution time, at step 1506, the ignition time is assumed to be a new execution time and at this timing, the execution operator list 915 is emptied and at step 1507, only the object operator is input to the execution operator list 915. At step 1508 it is determined whether all operators have been processed.

Figure 16:
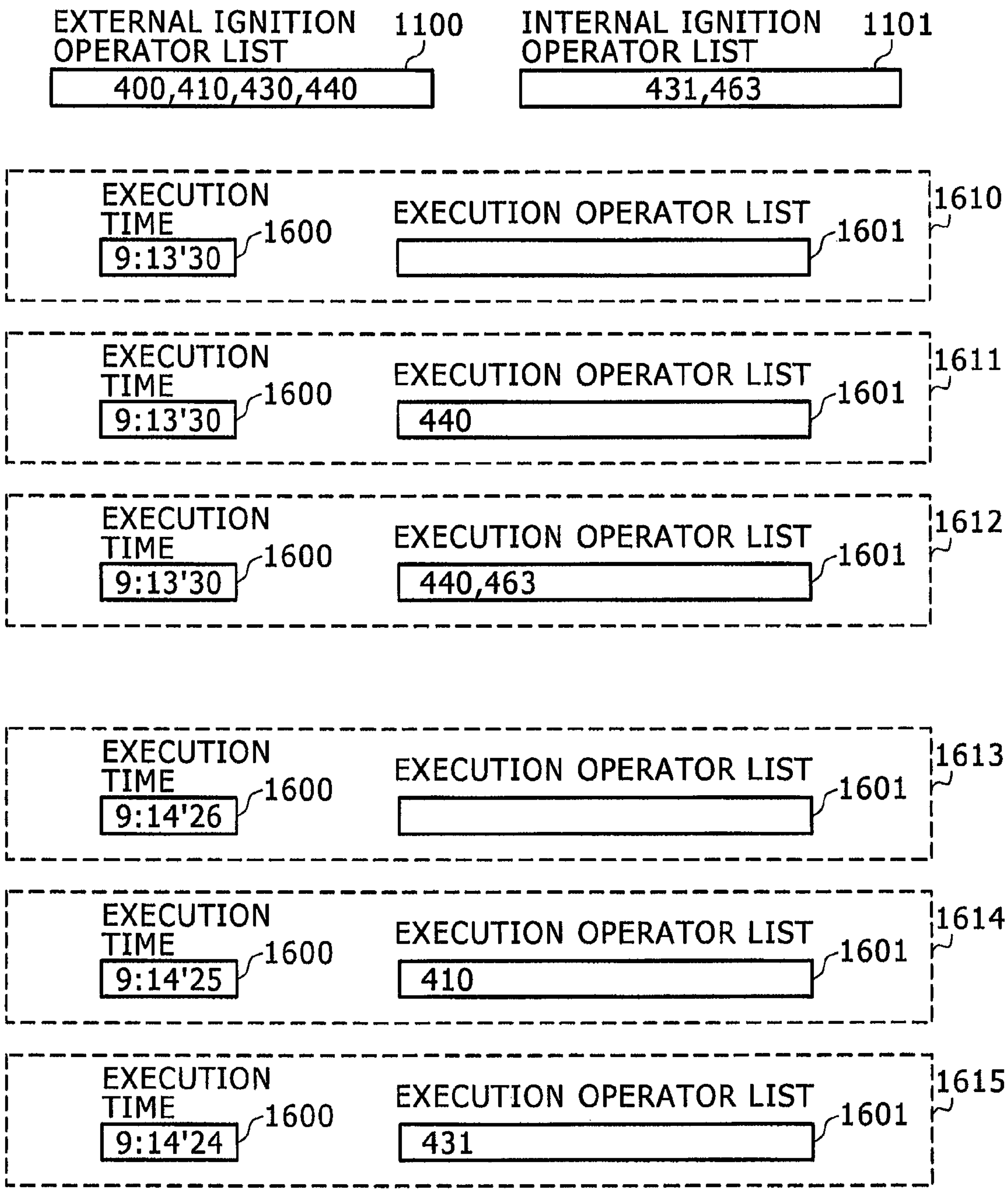
FIG. 16 is an explanatory diagram of a data structure used in the flow chart of FIG. 15.

FIG. 16 shows a form of state transition in the processing according to the flow of FIG. 15.

A state 1610 is a state where step 1501 is executed in the operator tree of the system time 9:13'30 shown in FIG. 8B. A state 1611 is a state after the flow execution for the external ignition operator list 910. The operator 440 that keeps the tuple to be output and has the same ignition time as the execution time 1600 9:13'30 is stored in the execution operator list 1601 (corresponding to the list 915 of FIG. 9). A state 1612 is a state after the flow execution for the internal ignition operator list 911. Although the tuple to be output is kept, the operator 431 where the ignition time is further delayed than the execution time is not input to the execution operator list 1601 and the operator 463 where the ignition time and the execution time are at the same time is input thereto.

A state 1613 is a state where step 1501 is executed in the operator tree of the system time 9:14'26 shown in FIG. 8C. A state 1614 is a state after the flow execution for the external ignition operator list 910. The operator 410 that keeps the tuple to be output and has the ignition time 9:14'25 earlier than the original execution time 9:14'26 is stored in the execution operator list 1601. The execution time is updated to the ignition time. A state 1615 is a state after the flow execution for the internal ignition operator list 911. When the operator 431 is processed by a loop of step 1502, since it keeps the tuple to be output and has the ignition time 9:14'24 earlier than the original execution time 9:14'25, it is determined that both steps 1503 and 1504 are determined to be 'Yes', at step 1506, the execution operator list 1601 is cleared at this timing and the execution time is updated to 9:14'24, and at step 1507, only the operator 431 remains in the execution operator 1601.

Figure 17:
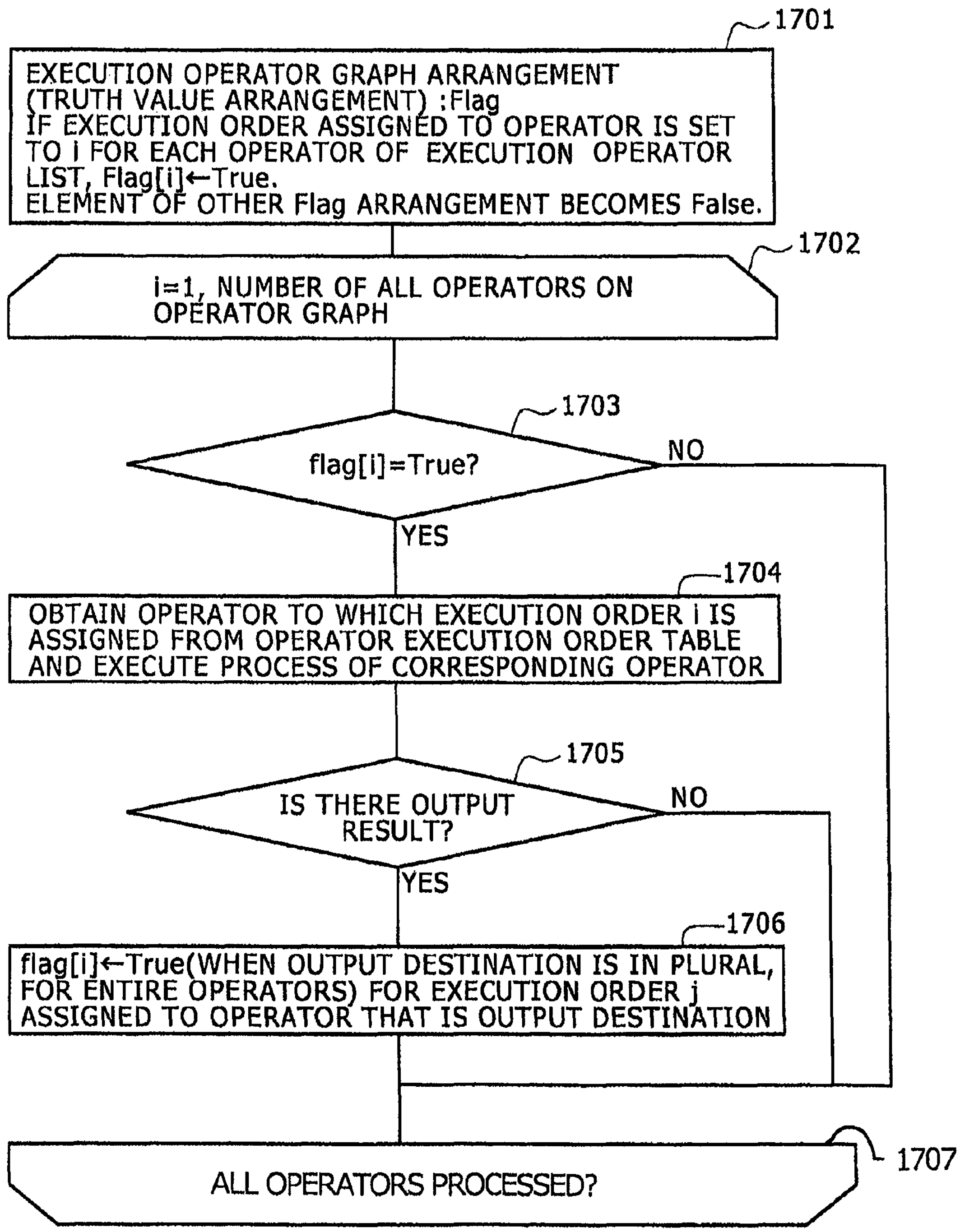
FIG. 17 is a diagram showing a flow chart of the operator execution control according to the first embodiment.

Next, FIG. 17 is a flow chart for explaining the operation of the operator execution control unit 916 of FIG. 9. The execution operator graph arrangement 917 that is a work area used at the time of executing the operator execution control unit 916 is an arrangement of a truth value that has the same number of elements as the number of operators on the operator graph. Further, an index starts from 1. First, at initialization step 1701, as a result of the processing of the execution operator extraction unit 913, an arrangement element that assumes the execution order of the operators, which is stored in the execution operator list 1601, to be the index is initialized to 'True' and all other arrangement elements are initialized to 'False'. Thereafter, a loop of step 1702 is repeated for all the arrangement elements while incrementing the index. First, at step 1703, it is determined whether the arrangement element is 'True' or not. In the case of 'False', the processing of the index ends. In the case of 'True', at step 1704, the ID of the operator that assumes the index value as the execution order is obtained from the operator execution order table and the processing of the operator is executed. As the processing result of the operator, at step 1705, it is determined whether the output results are generated or not. In the case where there is no the output result, the processing of the index ends. When there is the output result, at step 1706, the arrangement elements of the execution operator arrangement 917 that assumes the operator execution order assigned to the operator of the output designation as the index are set to 'True'. At step 1707 it is determined whether all operators have been processed.

Figure 18:
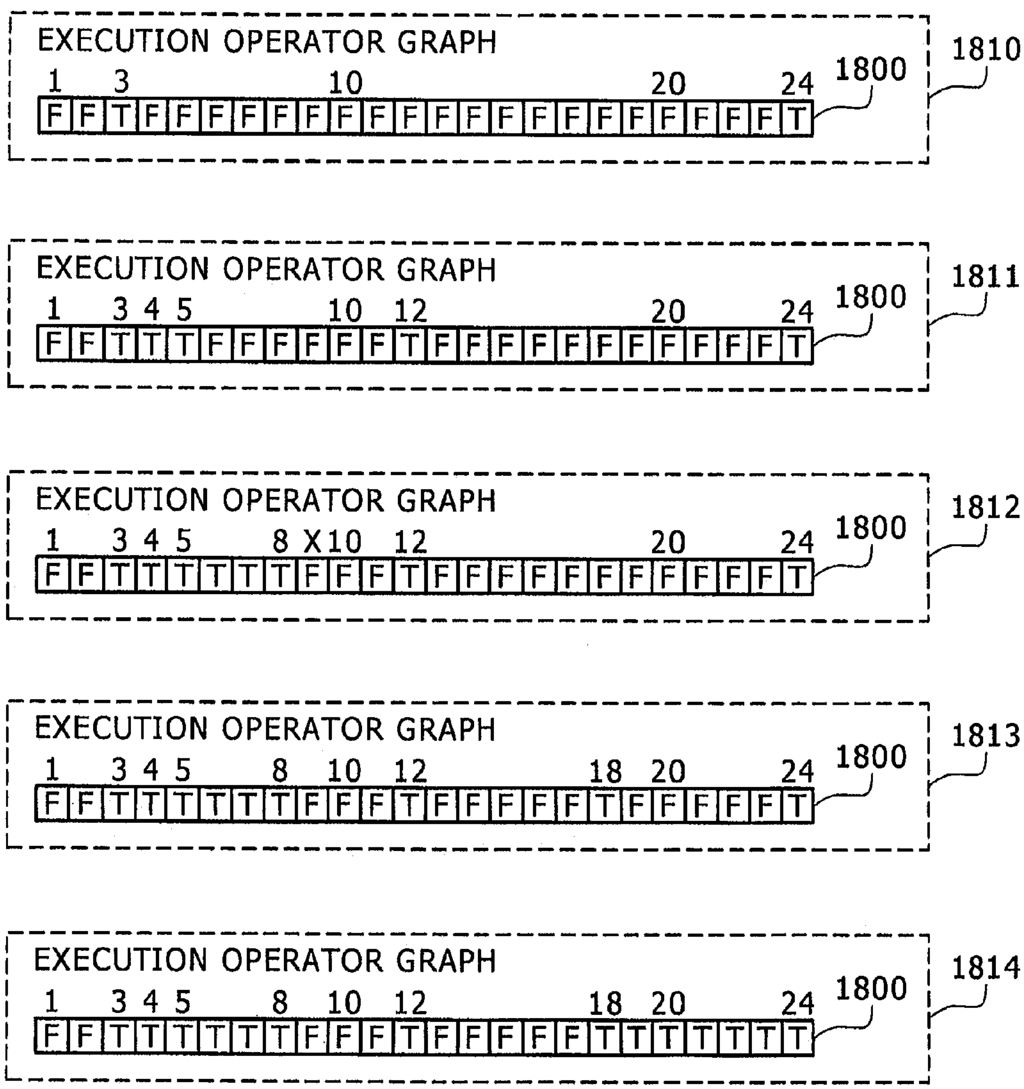
FIG. 18 is an explanatory diagram of a data structure used in the flow chart of FIG. 17.

FIG. 18 shows a form of a state transition in the processing according to the flow of FIG. 17.

A state 1810 is a state where step 1701 is executed in the operator tree of the system time 9:13'30 shown in FIG. 8B. The operators 440 and 463 are stored in the execution operator list 1601 and since it can be appreciated from the operator execution order table 1400 that each operator execution order is 3 and 24, only the third and twenty-fourth elements of the execution operator arrangement 1800 are set to 'True'. A state 1811 is a state that executes the processing of the operator 441 having the indexes in the operator execution order and since there are output results, executes step 1706, at step 1704 of the index 4 in a loop of step 1702. Fifth and twelfth arrangement elements that are the operator execution order of each of operators 432 and 403 that are the output designation of the operator 441 are set to 'True'.

A state 1812 executes the processing of the operator 435 having the index in the operator execution order at step 1704 of the index 8 in a loop of step 1702, such that it is a state where there is no output. No processing of the indexes 9, 10, and 11 in a loop of step 1702 is executed since it is determined to be No at step 1703. A state 1813 is the processing result of the subsequent index 12. A state 1814 is a state where the entire loop of step 1702 ends.

The operator tree is constructed considering a plurality of queries as one query and when the time information of the data tuple meets a predetermined requirement, the operator tree constructing the input tuple is executed in order, assuming the processing of the executed predetermined operator as momentum and the processing ends.

The execution order between the plurality of operators including the predetermined operator (ignition operator) is previously specified, whether the processing execution of the ignition operator starts or not is controlled and the processing of all the execution trees is managed. Whether to meet any predetermined requirements is monitored and when meeting a predetermined requirement, the processing of the ignition operator starts. When the process starts, the operator performs the processing of the tuple corresponding to the start time and after the processing ends, the next operator sequentially starts the processing of the tuple corresponding to the start time. Thereby, since the operator in the operator tree conforms to the time of the data of an object to be processed, a trace at the time of error can be easily achieved.

In addition, in the case of queries where the head of each of the plurality of registered queries has a scan operator and the tail thereof has a store operator, when the operator tree constructed by the execution control method is connected between these queries, it may delete the store operator of the tail of the previous query and the scan operator of the subsequent query and may reconstruct the operator tree as one query. In this case, the queue between the original queries can be canceled and the effect on the performance is reduced due to the queue exclusion.

As described above, the flow of FIG. 17 is the execution control method using the arrangement. As the execution control method keeping the operator execution order that is not limited to the first embodiment, for example, there are a method that memorizes all the operators positioned at the output destination each time the operator is executed and, among those, repetitively executes the operator having the smallest execution order and a method that squeezes an object assigned with the operator execution order only by the streaming operation and softens the execution control.

Second Embodiment

Hereinafter, as a second embodiment, a stream data processing system that performs an execution control of a recursive query will be described.

Figure 7:
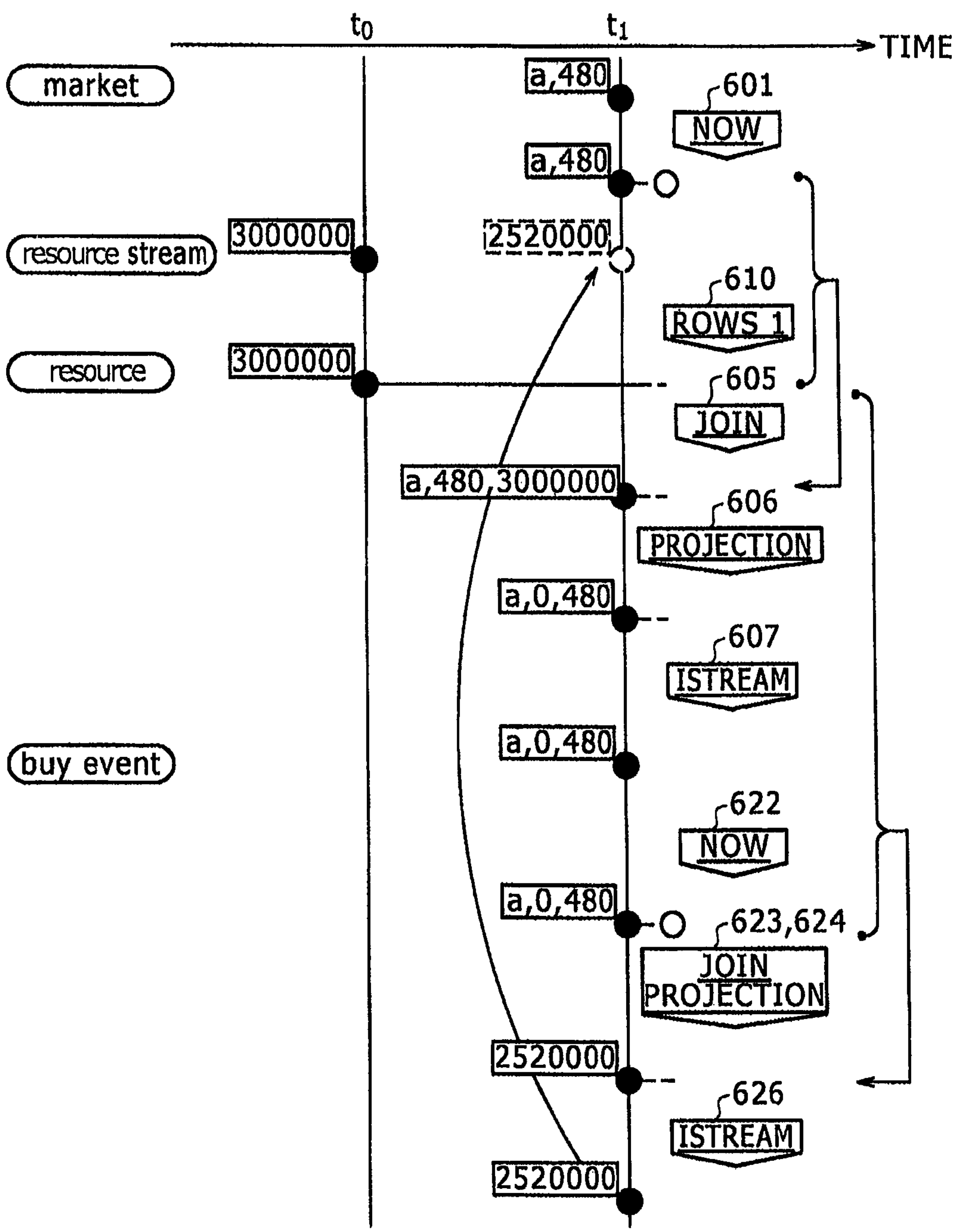
FIG. 7 is an explanatory diagram showing the problem in implementing the data processing definition of FIG. 5.
Figure 19:
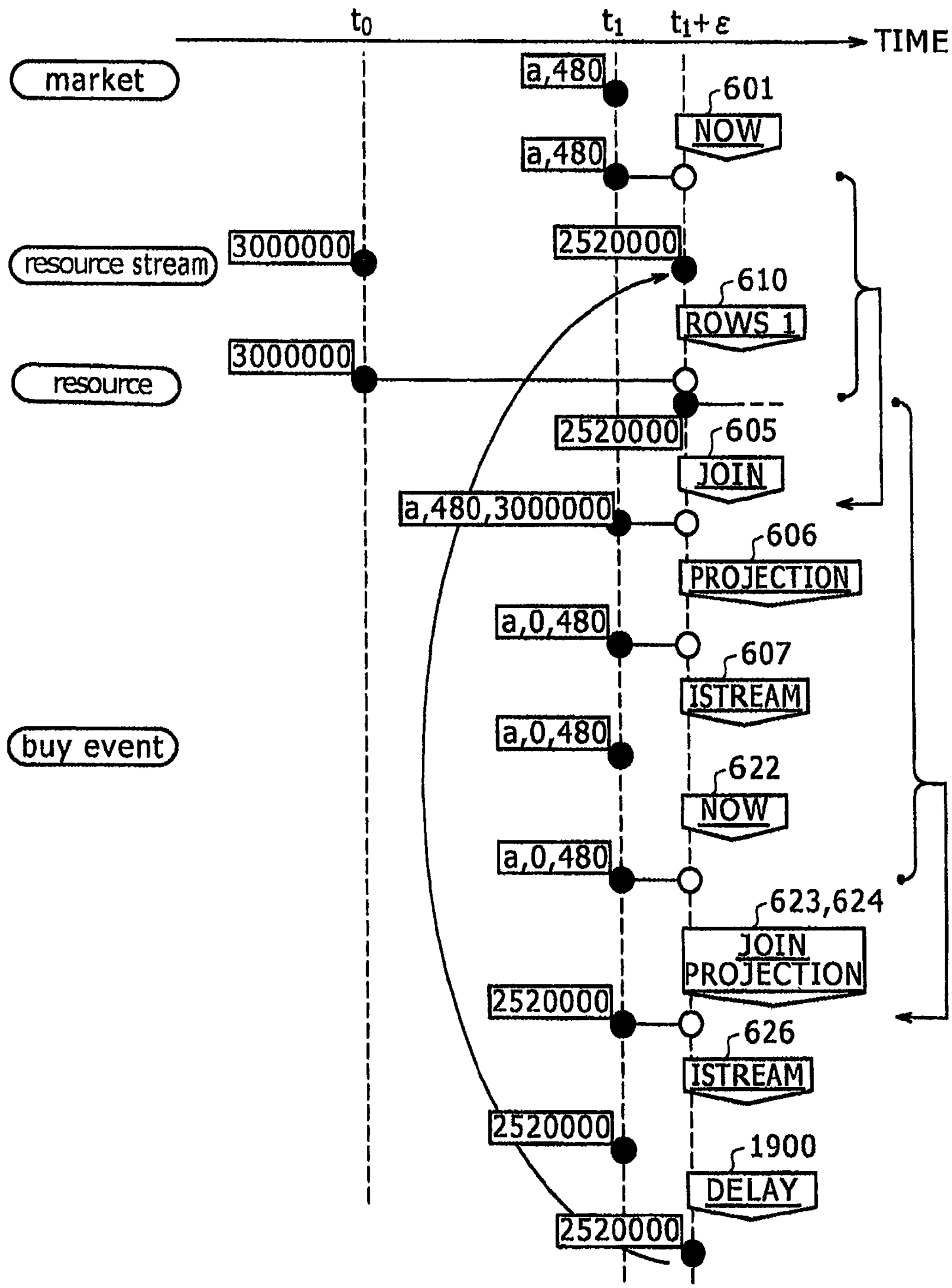
FIG. 19 is an explanatory diagram of a solution method of the problem of FIG. 7 according to a second embodiment.

FIG. 19 shows a state where a delay operator 1900 that is a delay operator shifting the time stamp of the stream tuple to the future is inserted after the streaming operator 626 in FIG. 7. Since the time delay intervenes so that the output of the streaming operator returns to its own input at the time deviation, the output of the streaming operation itself has no effect on the increase and decrease of the relation at time t1. As such, the delay operator intervenes in the way of the recursive query, making it possible to prevent the deadlock of the streaming operation and implement the recursive query.

The time stamp of the final output tuple shifts to the future by a finer time $\epsilon$ than t1 by the delay operator 1900 and returns to the stream 'resource_strem'. The fine time is the same as the survival period that is defined by the window operator 'NOW'. In the relation 'resource' that is a result of the row based operator 610, the relation 2520000 reflecting the change in the amount of money starts from time t1+$\epsilon$. For the stream 'market', the survival period assigned by the window operator 601 ends at just t1+$\epsilon$, the joining with the relation does not occur and the excessive buying order does not occur.

The delay operator for the query may be automatically inserted and may be explicitly inserted as a portion of the query definition. FIG. 20 explicitly shows an example of the query into which the delay operator is inserted. "NOW" surrounded by "<" and ">" finally applied of a query 2012 becomes a difference with the query 512 of FIG. 5 and designates that the result of the streaming operator IStream shifts to the future by a fine time. The width of the shifted time may be a detailed value such as 1 second, 1 minute, etc. As such, since the delay operator is the operator keeping the tuple of the time limited ignition, it is a third internal ignition operator subsequent to the time window or the RStream.

Figure 21:
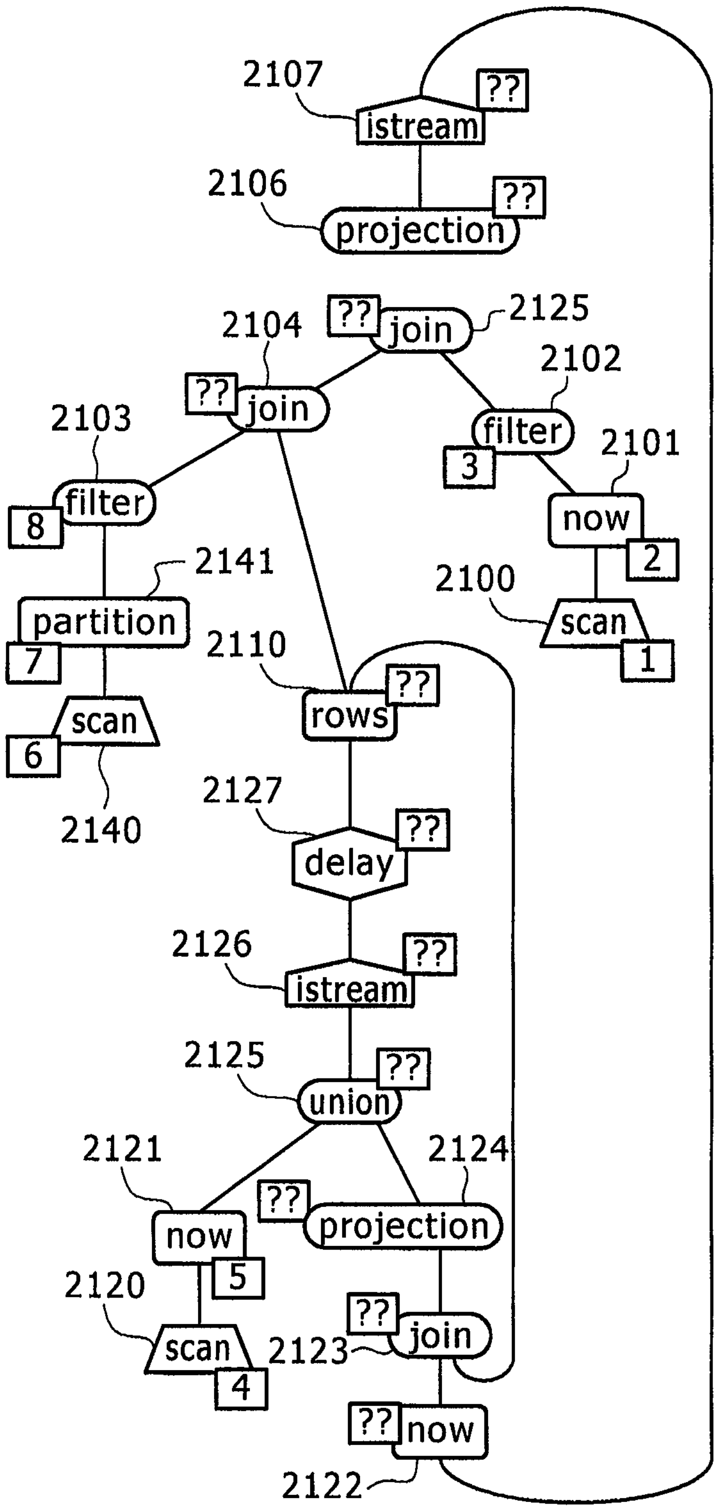
FIG. 21 is an explanatory diagram of the implementation method of the data processing definition of FIG. 20.

FIG. 21 is the operator tree of the query of FIG. 20 and includes the delay operator as the operator 2127. Since the operator tree includes a loop and the inter-operator input and output relation becomes the mutual recursion, the operator execution order cannot be set in the algorithm described with reference to FIGS. 10 to 14. Although the operator execution order showing a square frame of FIG. 21 is set for eight such as 2100, 2101, 2102, 2120, 2121, 2140, 2141, and 2103 that are operators not positioned on the loop, other operators cannot be defined.

With respect to this problem, the second embodiment provides a method of setting the operator execution order using the delay operator that exists in the loop. The basic policy of the method will be described with reference to FIGS. 22A and 22B. The delay operator can catch the end point of the processing in any execution time. The reason is that if the tuple assigned with the time stamp of the execution time is processed and output by the delay operator, it is at a future time from the execution time, such that it is away from the processing object in the execution time. The processing of the same time tuple can be implemented on the loop by assuming the delay operator included in the loop as the start point and the end point of the operator execution order using it.

Figure 22A:
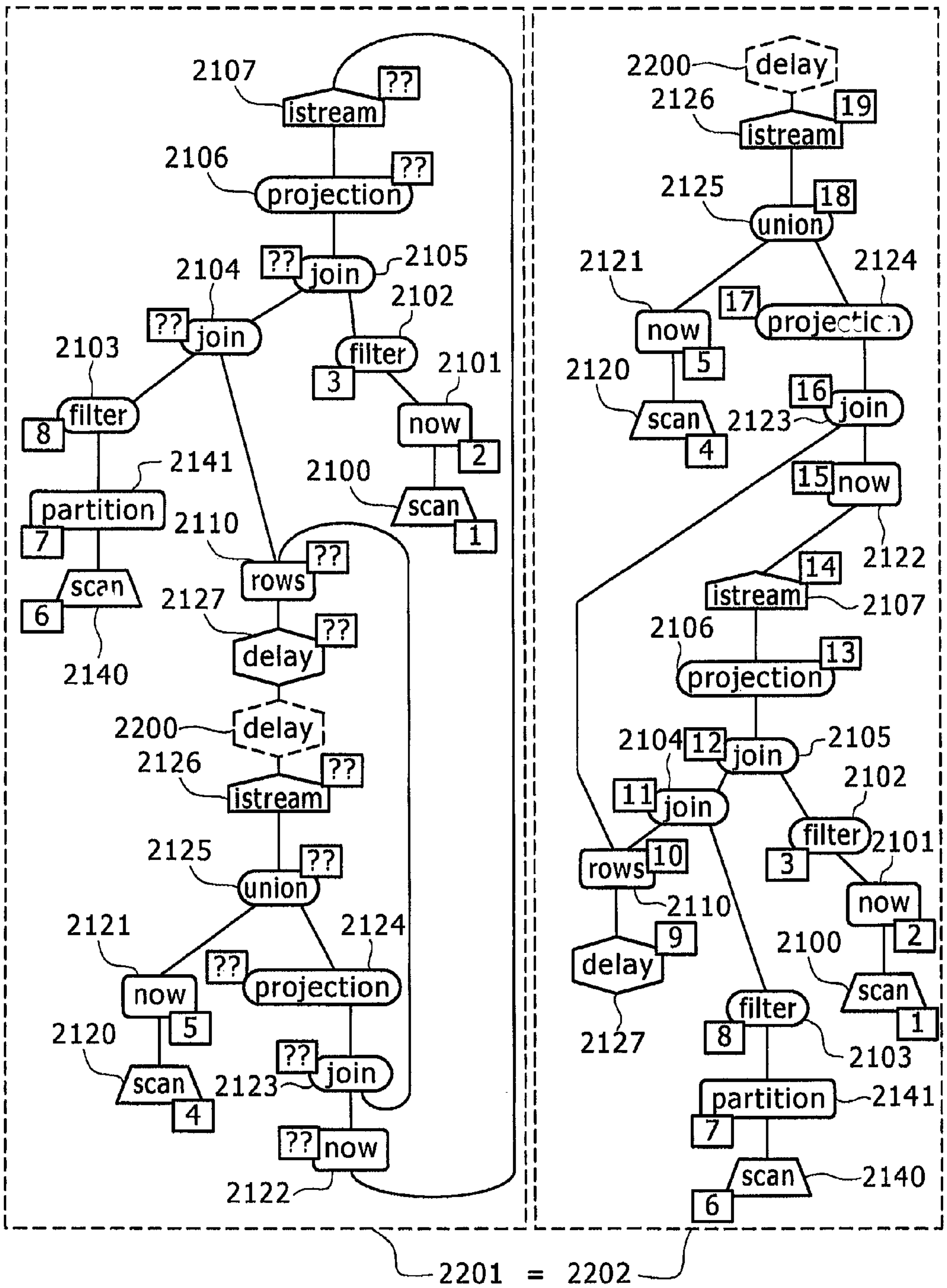
FIG. 22A is an explanatory diagram of the implementation method of the data procession definition of FIG. 20.
Figure 22B:
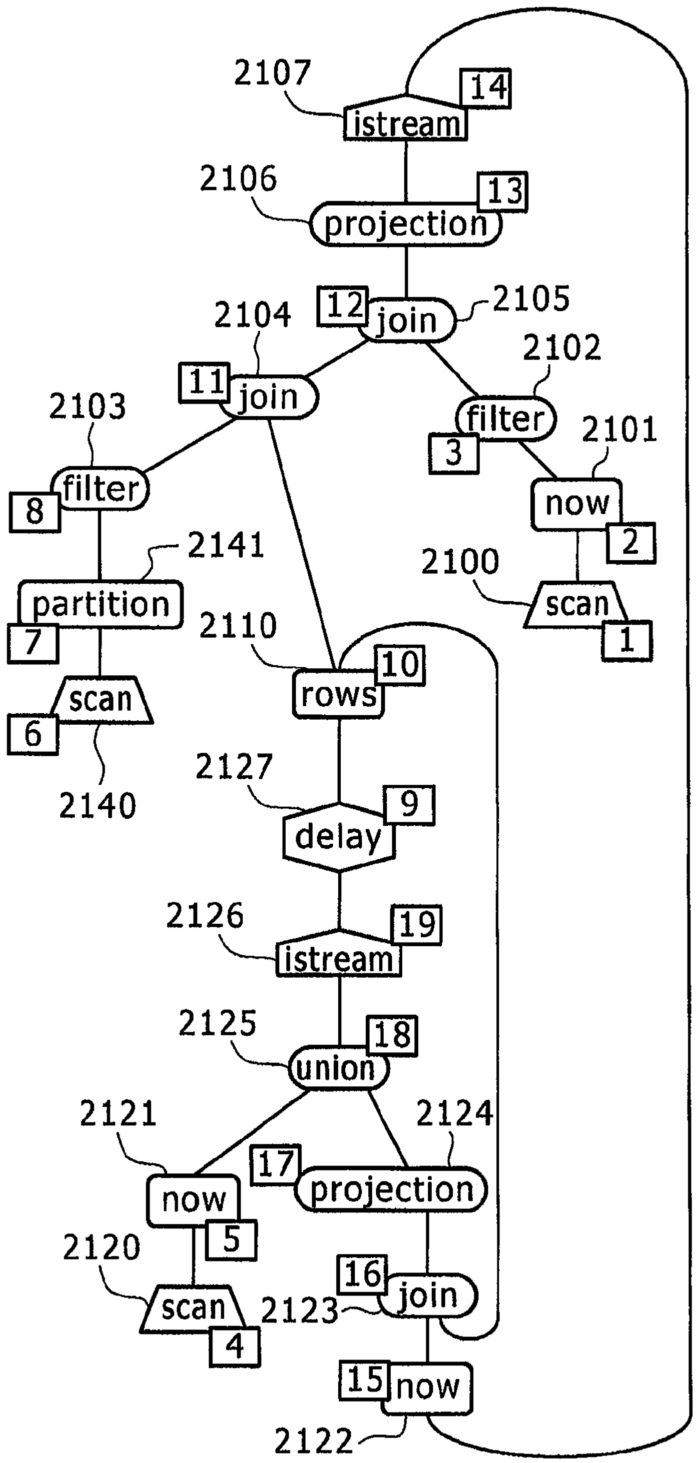
FIG. 22B is an explanatory diagram of the implementation method of the data processing definition of FIG. 20.

An operator tree 2201 of FIG. 22A separates a delay operator 2127 into a virtual delay operator 2200 in the operator tree of FIG. 21. Reference numeral 2127 is an output from the delay operator and reference numeral 2200 is an operator having only the input to the delay operator. Although a graph of an operator tree 2201 is of the same form as a graph of an operator tree 2202, it more intuitively shows that the operator tree does not include the loop by separating the delay operator. Since there is no loop, it is possible to define the operator execution order. Finally, the operator execution order shown by figures surrounded by a square frame of FIG. 22B is set. As described above, one delay operator is separated and is converted into the operator tree that does not have the loop and is called a deployment of the loop in the delay operator.

Further, in FIG. 21, since the streaming operator is two, the delay operator may be input to the front of any one side or to both sides. However, if the delay operator is input to only the front of the operator 2107, since the delay operator does not exist in the loop configured of operators 2123 to 2127 and 2110, it is essential after operator 2126. It is preferable to optimize the insertion position so that the insertion number of the delay operator is minimized.

Third Embodiment

Next, as a third embodiment, an example of an operator tree having a more complicated loop will be described with reference to FIGS. 23A and 23B to FIG. 32.

FIGS. 23A and 23B show an example where the selling order processing is also defined by the recursive query in the query of FIG. 20. A query 2315 merges the change in stock holding information by the buying order and the selling order. Thereby, it is possible to rapidly reflect the change in the stock holding information by the order in the investment behavior. The delay operator is explicitly defined in the query.

Figure 24:
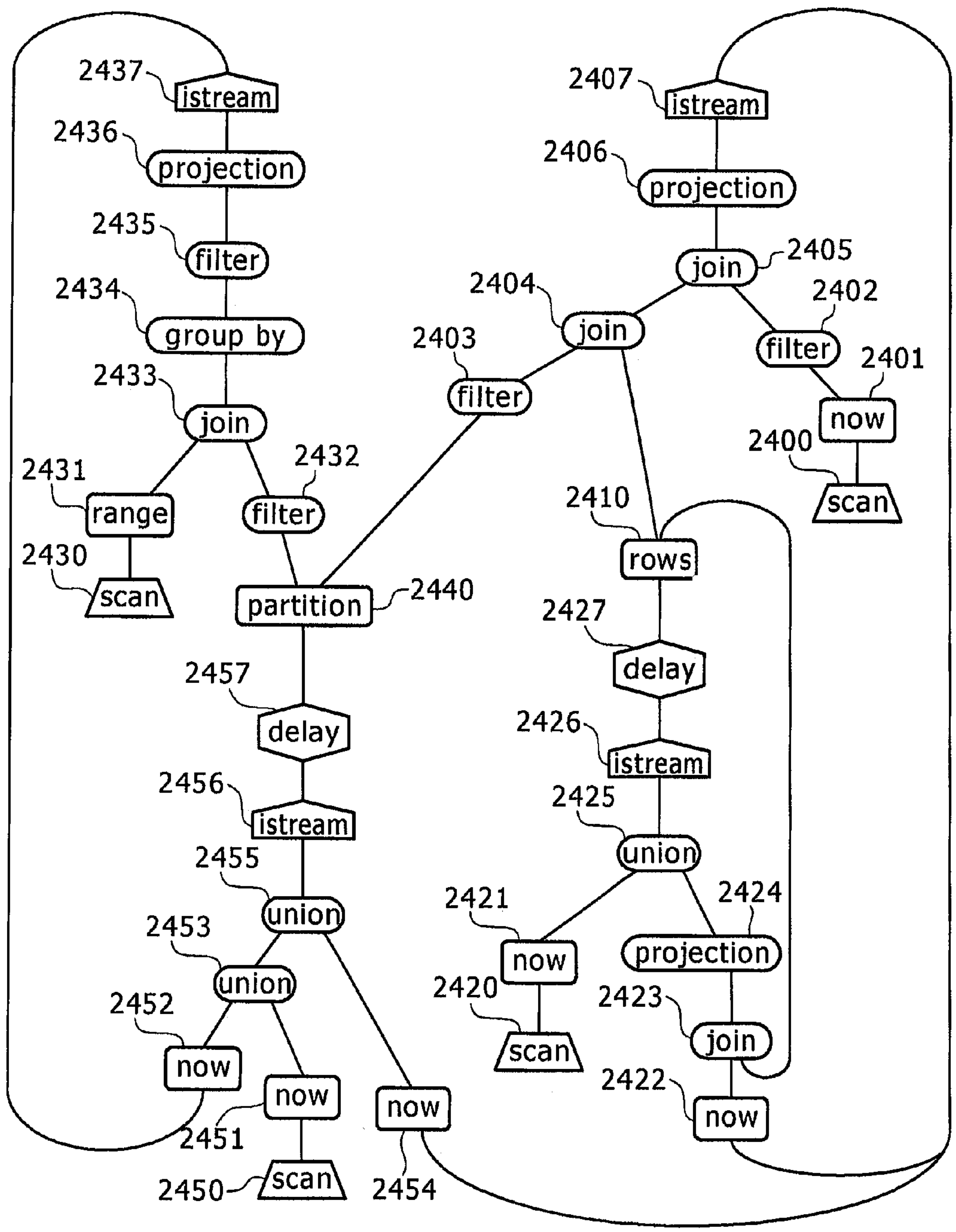
FIG. 24 is an explanatory diagram of the implementation method of the data processing definition of FIGS. 23A and 23B.

FIG. 24 shows the operator tree of the above query. There are two delay operators 2427 and 2457. The operator tree forms a big loop except for 9 operators of operators 2400, 2401,2402,2420,2421,2430,2431,2450, and 2451. In the directed graph, a set of nodes that has the mutually reaching relation as described above is called the strongly connected component.

Figure 25A:
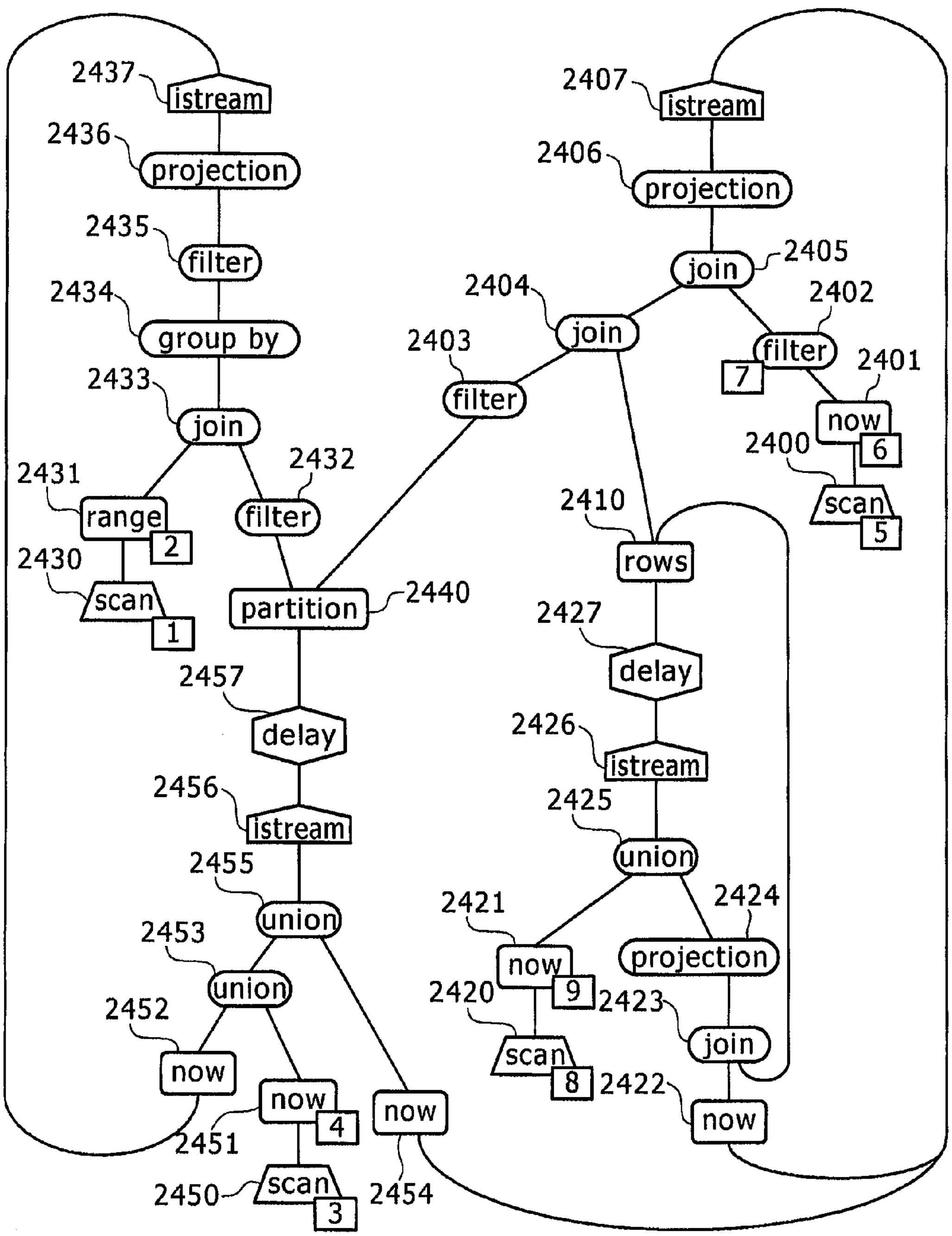
FIG. 25A is an explanatory diagram of the implementation method of the data processing definition of FIGS. 23A and 23B.

FIG. 25A shows that the operator execution order for nine operators that is not included in the strongly connected component is assigned. In detail, reference numeral 2430 indicates a first operator, reference numeral 2431 indicates a second operator, reference numeral 2450 indicates a third operator, reference numeral 2451 indicates a fourth operator, reference numeral 2400 indicates a fifth operator, reference numeral 2401 indicates a sixth operator, reference numeral 2402 indicates a seventh operator, reference numeral 2420 indicates an eighth operator, and reference numeral 2421 indicates a ninth operator. Figures surrounded by a square frame at a lower right or left of each operator indicates the execution order of each operator.

Figure 25B:
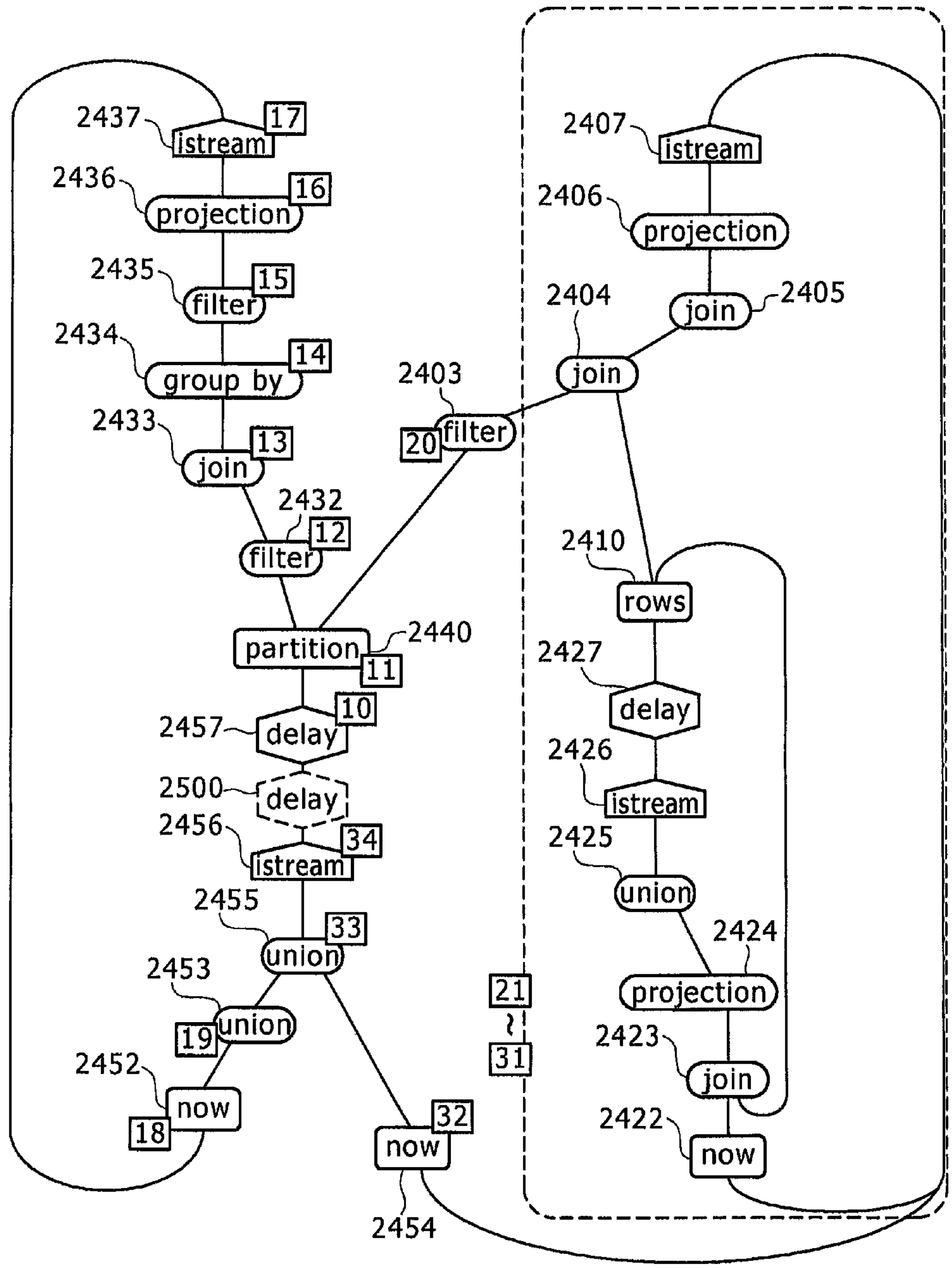
FIG. 25B is an explanatory diagram of the implementation method of the data processing definition of FIGS. 23A and 23B.
Figure 25C:
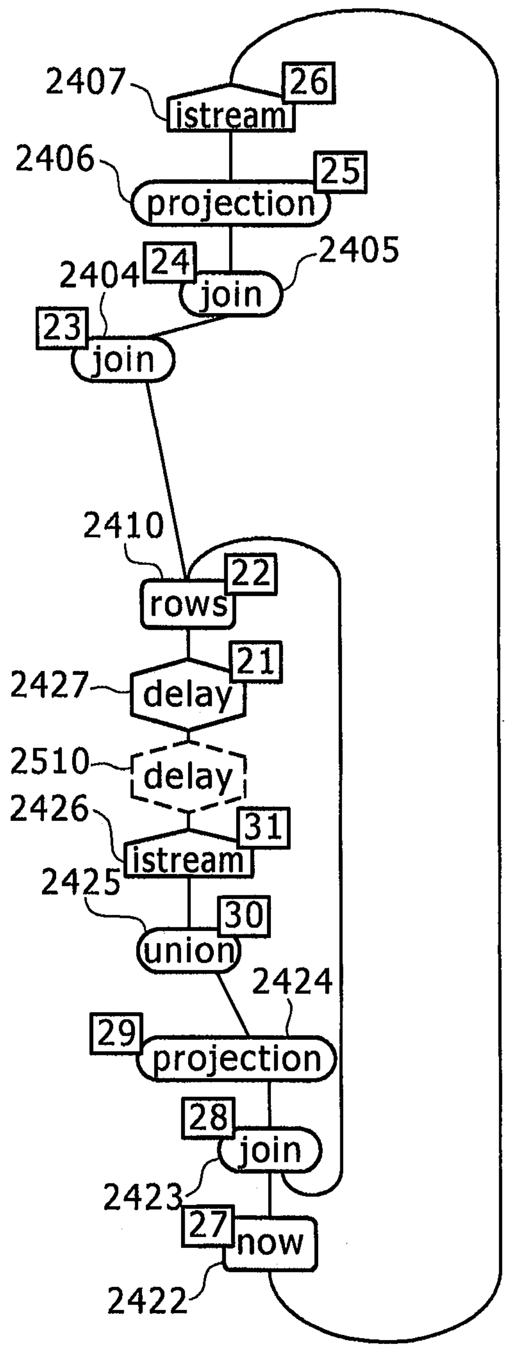
FIG. 25C is an explanatory diagram of the implementation method of the data processing definition of FIGS. 23A and 23B.
Figure 26:
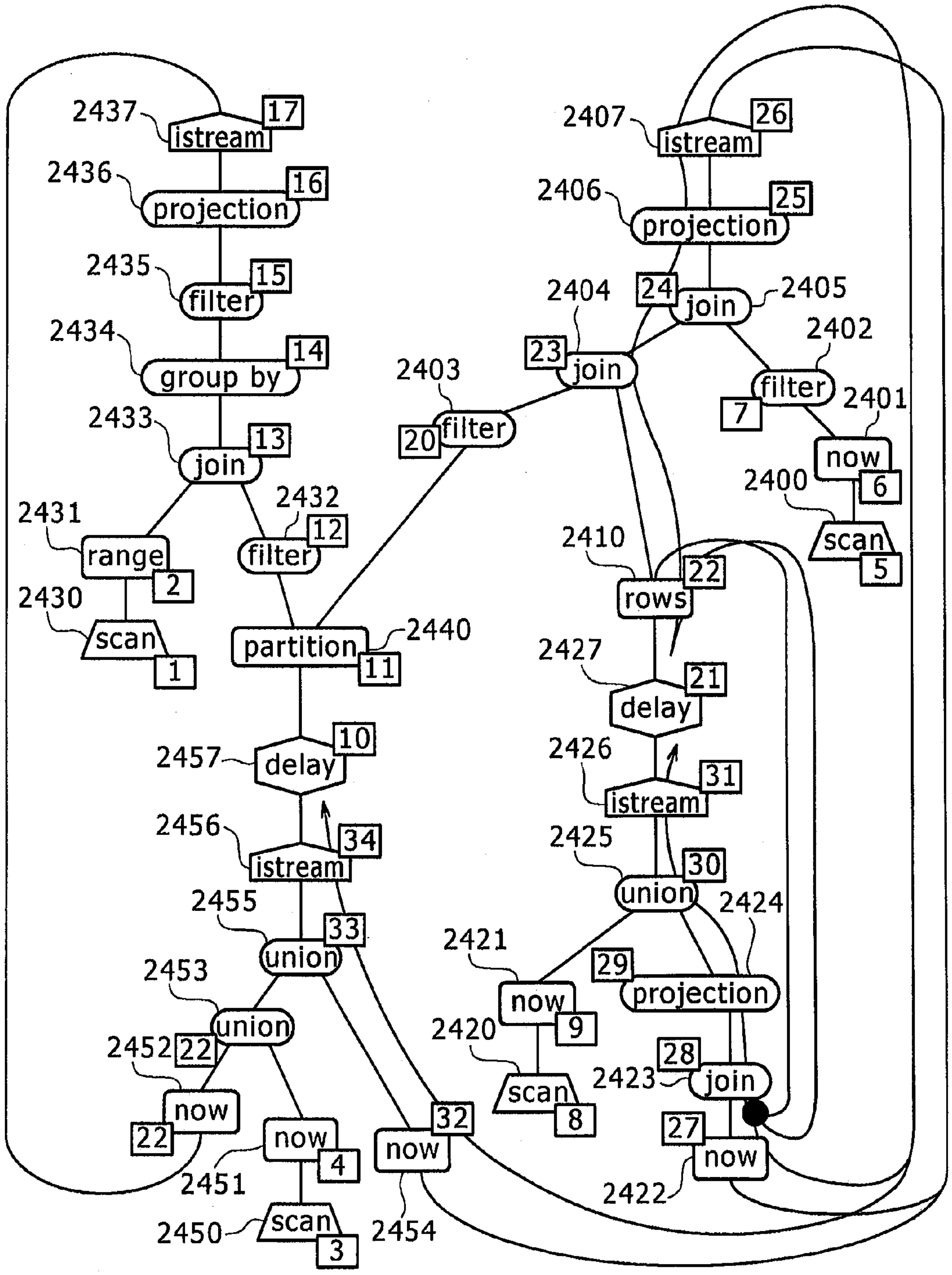
FIG. 26 is an explanatory diagram of the implementation method of the data processing definition of FIGS. 23A and 23B.

FIG. 25B shows the operator tree that deploys the strongly connected component by the delay operator 2457. However, eleven operators surrounded by a broken line 2501 also forms the strongly connected component. If the strongly connected component is caught as one virtual operator, it is possible to set the operator execution orders 10 to 20 and 32 to 34 for the operators which are not surrounded in the broken line. The execution order of 21 to 31 is assigned to the operator within a broken line 2501. FIG. 25C shows a state that the strongly connected component is deployed by the delay operator 2427 and the execution order of 21 to 31 is set. Finally, the execution order of all operators belonging to the operator tree is set as shown by figures surrounded by a square frame of FIG. 26. At the time of executing the query, when the operator 2427 becomes the execution operator, the execution of the operator assuming the operator as a start point progresses along a path of an arrow of a thick curved line.

Figure 27A:
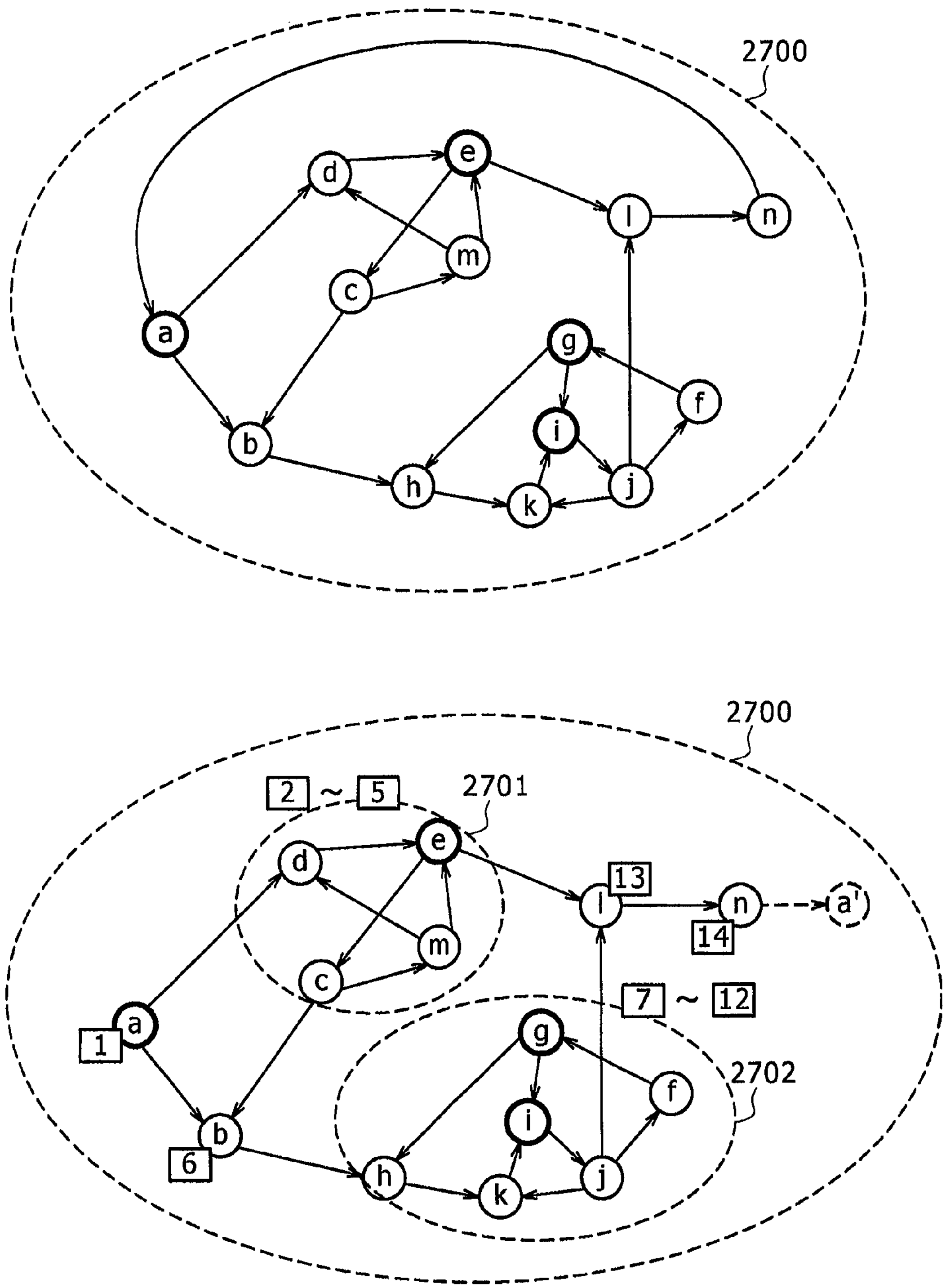
FIG. 27A is an explanatory diagram of a method for determining the operator execution order according to the third embodiment.
Figure 27B:
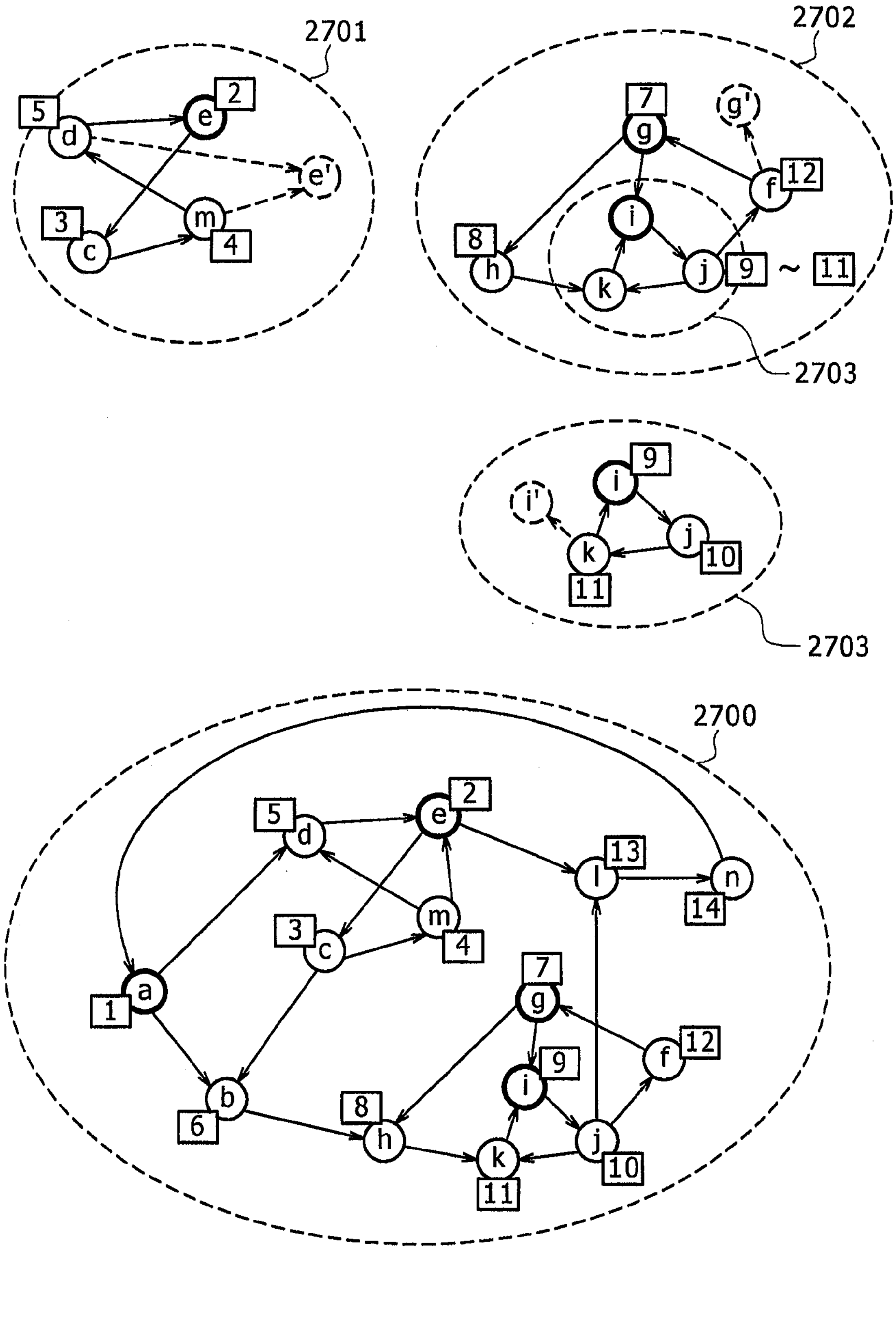
FIG. 27B is an explanatory diagram of the method for determining the operator execution order according to the third embodiment.

FIGS. 27A and 27B show a method for setting a similar execution order even in a more complicated operator graph. The operator graph 2700 includes fourteen operators of a to n and a large circle indicates the delay operator. First, the nested strongly connected components 2701 and 2702 are extracted by deploying the graph 2700 by the operator a. If each component is caught as one virtual operator, the operator execution order 1, 6, 13, and 14 is set for operators a, b, 1, and n. The strongly connected component 2701 is deployed by the operator e, such that the operator execution orders 2, 3, 4, and 5 are set for operator e, c, m, and d. The nested strongly connected component 2703 is extracted by deploying the strongly connected component 2702 by operator g. If each component is caught as one virtual operator, the operator execution order 7, 8, 12 is set for operators g, h, and f. Operator execution order 9, 10, and 11 is set for operators i, j, and k by deploying the strongly connected component 2703 by operator i. Finally, the execution order of the total of fourteen operators is set.

In the above processing, the delay operator for deploying the strongly connected component may be arbitrarily selected. If the strongly connected component does not include the delay operator, anything, which is assumed as the error of the query definition, issues an alarm, or is automatically inserted, may be used. When the delay operator is automatically inserted, it is preferable that the insertion position of the delay operator or the selection of the delay operator in the decomposition of the strongly connected component is optimized so that the number of insertions of the delay operator is minimized.

Figure 28A:
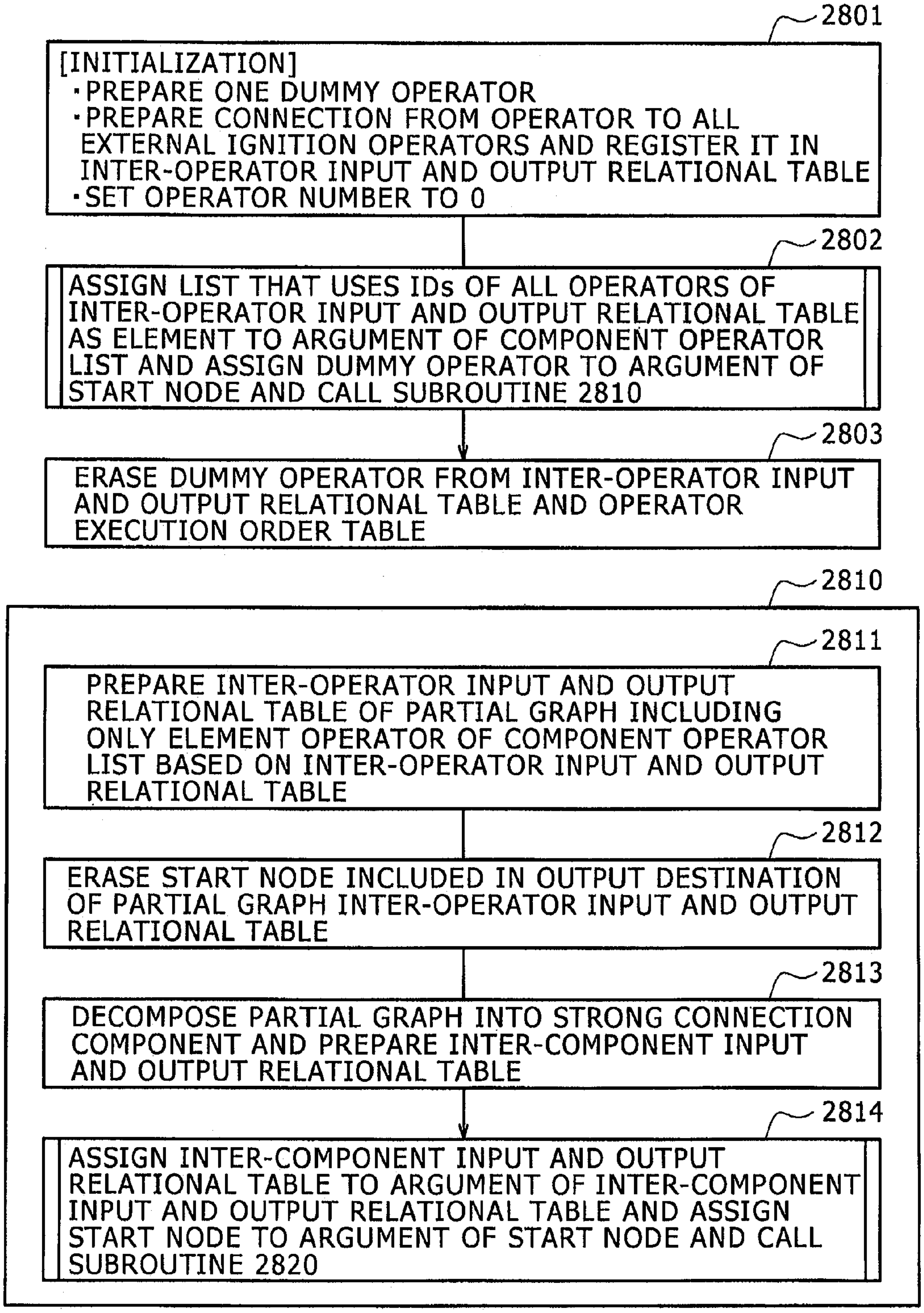
FIG. 28A is a diagram showing a flow chart for determining the operator execution order according to the third embodiment.
Figure 28B:
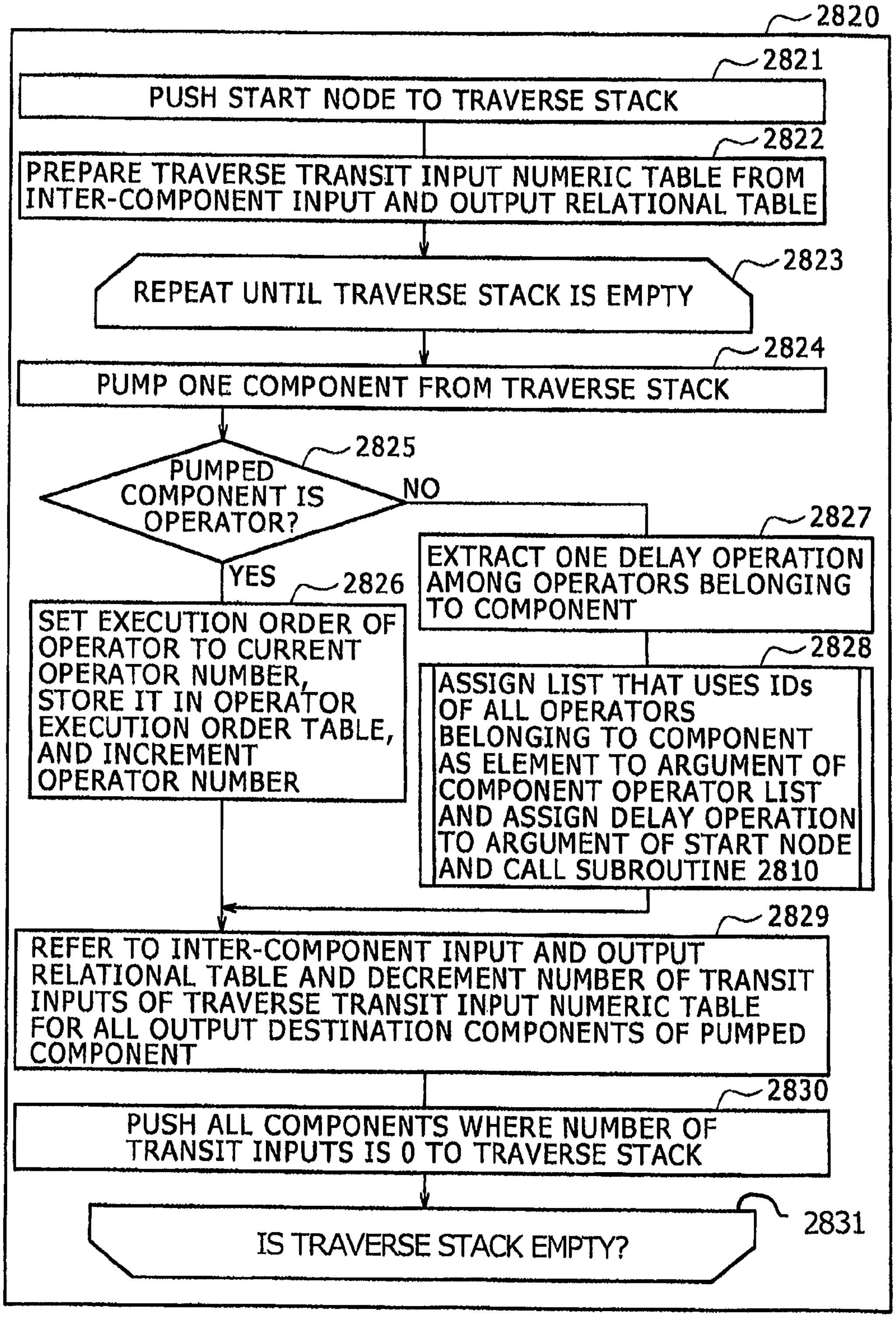
FIG. 28B is a diagram showing a flow chart for determining the operator execution order according to the third embodiment.

FIGS. 28A and 28B show a flow chart of an extended algorithm so that the algorithm of FIG. 12 setting the operator execution order can be applied to a general operator graph including the loop.

First, at step 2801, one dummy operator assigned with the execution order 0 is prepared and all the external ignition operators are registered, as the output destination operator of the dummy operator in the inter-operator input and output relational table of the operator graph that becomes an object. Further, the operator number is initialized to 0.

At continued step 2802, a subroutine 2810 is called. The subroutine assigns a list assuming all the operators including the dummy operator as an element to an argument of a component operator list and assigns the dummy operator to an argument of a start node.

Next, the processing of the subroutine 2810 is shown. First, at step 2811, an inter-operator input and output relational table of a partial graph including only the element of the component operator list assigned to the argument is prepared. The table can be prepared by extracting only the registration relating to the element of the component operator list in the inter-operator input and output relational table of all the operator trees and when ones other than the element of the list appear on the output destination operator string of the extracted registration, deleting them. At continued step 2812, when the start node appears on the output destination of the inter-operator input and output relational table of the partial graph, they all are deleted.

At continued step 2813, the inter-component input and output relational table is prepared by decomposing the partial graph into the strongly connected component. A method for decomposing any directed graph into a mutually sparse strongly connected component can be implemented by using a typical algorithm, etc., devised by Tarjan. When there are input and output relations from one or more operators belonging to any strongly connected component toward one or more operators belonging to another strongly connected component, the inter-component input and output relational table registers the latter component as the output destination component of the former component. At continued step 2814, a subroutine 2820 is called. The subroutine assigns the inter-component input and output relation to the argument of the inter-component input and output relational table and assigns the start node to the argument of the start node.

Next, the processing of the subroutine 2820 is shown. The flow of the subroutine 2820 is similar to the flow shown in FIG. 12. Each node in the traversed graph has a difference in that it is a strongly connected component including a single operator as well as a plurality of operators. In particular, the single operator is also a kind of strongly connected component.

First, at step 2821, the start node is pushed to the traverse stack. At continued step 2822, a traverse transit input numeric table is initialized from the inter-component input and output relation table assigned to an argument. In the process of traversing the component during the flow processing, if it arrives at a component that becomes an input of any component, the number of transit inputs of the former components is decremented.

A loop of continued step 2823 is repeated until the traverse stack is empty. First, at step 2824, one component is popped from the traverse stack. At continued step 2825, when the popped component is a single operator, at step 2826, the execution order of the operator is set to the value of the operator number at this timing and is stored in the operator execution order table. The operator number is incremented. At step 2825, when the popped component is a strongly connected component including a plurality of operators, at step 2827, one delay operator among the operators belonging to the component is selected and at continued step 2828, the subroutine 2810 is called. The subroutine assigns a list of all the operators belonging to the component to the argument of the component operator list and assigns the delay operator selected at step 2827 to the argument of the start node. At continued step 2829, the component that becomes the output designation of the popped component is extracted from the inter-component input and output relational table and in the traverse transit input numeric table, the number of transit inputs of all the output designation components is decremented. At this time, if there are components of which the number of transit inputs becomes 0, at continued step 2830, it is popped to the traverse stack. The processing is repeated until the traverse stack is empty and at step 2831 it is determined whether the traverse stack is empty or not.

Consequently, (3-1) the stream data processing system 900 deploys each of the operator graphs including the plurality of operators to node and makes a spot that becomes a closed path (recursion) by one or more operators from a tree structure into a component. The strongly connected component or the partial graph in FIG. 25 or FIG. 26 corresponds to the component or the subcomponent and is the virtual operator. (3-2) the stream data processing system 900 specifies the inter-component input and output relation by the generated component unit.

(3-3) the stream data processing system 900 defines the execution order for each component by the specified input and output relation. (3-4) the stream data processing system 900 determines whether the operator for each component is included in plural and if so, an operator configuring 'Delay Stream' that sets the input delay of the data tuple is added to the closed path. (3-5) the stream data processing system 900 further deploys the node within each component (closed path portion) as a new subcomponent again and repeats the processing of (3-2) to (3-4).

Next, FIGS. 29 to 32 show an operator of a case where the operator graph of FIG. 24 is processed by the flow processing of FIG. 28.

A table 2900 of FIG. 29 is the inter-operator input and output relational table in the operator graph of FIG. 24. The dummy operator is also registered by step 2801.

FIGS. 30A to 30G shows the state transition of the data structure in the processing of the algorithm shown in FIG. 28.

FIG. 30A shows a state before being input to a loop of step 2823 in a first call of the subroutine 2820. A table 3020 is an inter-component input and output relational table assigned to the argument. A component ID 3000 is a strongly connected component configured of the operator shown in a list 3001. In addition to this, it is a single operator and the component ID matches the operator ID. For the components (operators) 2402, 2421, 2431, and 2451, since each output designation operator 2405, 2425, 2433, and 2453 is included in the list 3001, the output designation component in the table becomes 3000.

A table 3030 is a traverse transit input numeric table prepared by step 2822. The number of transit inputs of any component ID becomes a frequency where the component ID appears on the output destination component of table 3020. The operator number stored in the operator number storage area 3010 remains in an initialized state to 0 at step 2801 at this timing. The dummy operator assigned to the argument of the start node is pushed to the traverse stack 3040 at step 2821.

FIG. 30B shows a state transition during the processing of the loop of step 2823 in the first call of the subroutine 2820.

A state 3050 indicates a state where at step 2824, the dummy operator is popped from the traverse stack 3040, at continued step 2825, is determined to be an operator, at continued step 2826, the operator number 0 is assigned to the dummy operator and is stored in an operator execution order table 3100, the operator number is incremented, continued step 2829, for the components 2400, 2420, 2430, and 2450 that are registered in the output destination component in the inter-component input and output relational table 3020, the value of the traverse transit input numeric table 3030 is decremented, and at a continued step 2830, the components 2400, 2420, 2430, and 2450 where the number of transit inputs of table 3030 becomes 0 are pushed to the traverse stack.

A state 3051 indicates a state that pops the component 2430 from the traverse stack 3040 and then traverses up to the component 2431 and performs step 2829 that decrements the number of transit inputs of the component 3000 that is the output designation of the component. In step 2829, since the number of transit inputs of the output destination 3000 does not become 0, it is not accumulated in the traverse stack. An operator execution order table 3100 becomes a state that determines the execution order of the operators 2430 and 2431. The operator number is incremented up to 3.

A state 3052 indicates a state where the processing of all the components 2450, 2400, and 2420 that are accumulated in the traverse stack 3040 ends and since the number of transit inputs of component 3000 becomes 0, the component 3000 is pushed to the traverse stack. The operator execution order is determined up to 9 and is stored in the operator execution order table 3100 and the operator number is incremented up to 10.

Thereafter, a loop of continued step 2823 calls the subroutine 2810 by popping the component 3000 from the traverse stack 3040 at step 2824, determining the component to be 'No' at continued step 2825, selecting one delay operator 2457 from the operator belonging to the component 3000 at continued step 2827, and assigning the operator list 3001 belonging to the component 3000 to the argument of the component operator list and assigning the delay operator 2457 to the argument of the start node at step 2828.

The processing of the subroutine call prepares the inter-operator input and output relational table of the partial graph configured of only the operators that is the elements of the component operator list (in this case, the list 3001) assigned to the argument at step 2811.

Figure 30D:
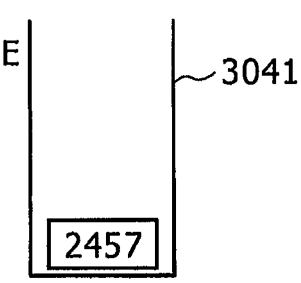
FIG. 30D is an explanatory diagram of the data structure used in the flow charts of FIGS. 28A and 28B.

A table 2901 shown in FIG. 30C is the prepared table. At continued step 2812, since the delay operator 2457 that becomes the start node assigned to the argument is included in the output designation of the operator 2456 in table 2901, it is deleted. At continued step 2813, the inter-component input and output relational table 3021 shown in FIG. 30D is prepared. At continued step 2814, the table is assigned to the argument of the inter-component input and output relational table and the delay operator 2457 is assigned to the argument of the start node to call the subroutine 2820.

FIG. 30D shows a state executed up to step 2822 in the subroutine call. A state 3053 shown in FIG. 30E indicates a state that pops the component 2457 from the traverse stack 3041, traverses it up to the component 2453, and decrements the number of transit inputs of the operator 2455 that is the output designation of the operator. In this processing, since the number of transit inputs of the operator 2403 becomes 0, it is accumulated in the traverse stack 3041. The operator execution order table 3100 is determined up to the execution order 19.

A state 3054 indicates a state that pops the component 2403 from the traverse stack 3041, processes it up to step 2826, decrements the number of transit inputs of the component 3002 that is the output designation of the component at step 2829, and since the value becomes 0, pushes the component 3002 to the traverse stack 3041 at step 2830.

Thereafter, a loop of continued step 2823 calls the subroutine 2810 by popping the component 3002 from the traverse stack 3041 at step 2824, determining the component to be 'No' at continued step 2825, selecting one delay operator 2427 from the operator belonging to the component 3002 at continued step 2827, and assigning the operator list 3003 belonging to the component 3002 to the argument of the component operator list and assigning the delay operator 2427 to the argument of the start node at step 2828.

The processing of the subroutine call prepares the inter-operator input and output relational table of the partial graph configured of only the operators that is the elements of the component operator list (in this case, the list 3003) assigned to the argument at step 2811. A table 2902 shown in FIG. 30F is prepared. At continued step 2812, since the delay operator 2427 that becomes the start node assigned to the argument is included in the output designation of the operator 2426 in table 2902, it is deleted. At continued step 2813, an inter-component input and output relational table 3022 is prepared. At continued step 2814, the table is assigned to the argument of the inter-component input and output relational table and the delay operator 2427 is assigned to the argument of the start node to call the subroutine 2820.

FIG. 30F shows a state executed up to step 2822 in the subroutine call. A state 3055 indicates a state where the component 2427 is popped from the traverse stack 3042 and is traversed up to the component 2426, the operator execution order of all the components is determined, and the traverse stack 3042 is empty. The operator execution order table 3100 is determined up to the execution order 31.

The processing of the subroutine 2820 ends at the above steps and returns to the called original step 2814. The processing of the subroutine 2810 ends at the above steps and returns to the called original step 2828. At continued step 2829, since if the number of transit inputs of the component 2454 that is the output designation of the component 3002 is decremented, it becomes 0, the component is pushed to the traverse stack 3041 at continued step 2830. A state 3056 shown in FIG. 30G indicates a state where the processing until now is completed.

A state 3057 indicates a state where the component 2454 is popped from the traverse stack 3041 and is traversed up to the component 2456, the operator execution order of all the components is determined, and the traverse stack 3041 is empty.

The processing of the subroutine 2820 ends at the above steps and returns to the called original step 2814. The processing of the subroutine 2810 ends at the above steps and returns to the called original step 2828. In the inter-component input and output relational table 3020, since there is no output designation component of the component 3000, continued steps 2829 and 2830 are not executed any more. At this timing, the traverse stack 3040 becomes empty.

The processing of the subroutine 2820 ends at the above steps and returns to the called original step 2814. The processing of the subroutine 2810 ends at the above steps and returns to the called original step 2802. At continued step 2803, the registration for the dummy operator is deleted from the inter-operator input and output relational table and the operator execution order table. As described above, the processing of the flow chart completed.

A table 3100 of FIG. 31 is an operator execution order table finally determined by the algorithm with respect to an example of the operator tree shown in FIG. 24.

Figure 32:
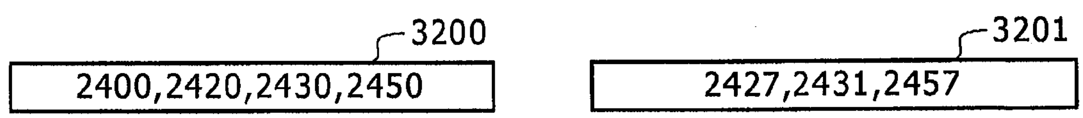
FIG. 32 is an explanatory diagram of the data structure used in the flow charts of FIGS. 28A and 28B.

In addition, FIG. 32 shows the ignition operator ID as a list in the operator tree shown in FIG. 24. Reference numeral 3200 indicates an external ignition operator list and reference numeral 3201 is an internal ignition operator list. The internal ignition operator list includes 2427 and 2457 that are the delay operators.

As described above, it is apparent that the determination algorithm of the operator execution order for the operator graph including the loop can also be applied to the operator graph that does not include the loop. The algorithm shown in the flow chart of FIG. 28 is a general algorithm shown by the flow chart of FIG. 12.

Moreover, the flow chart shown in FIGS. 15 and 17, which is operated at the time of the query execution can be applied to both the recursive query and the non-recursive query.

In the stream data processing of the present invention as described above, data processing of low latency can be implemented by a method for controlling operator execution. In particular, the method can be applied to a general query including a recursive query. Further, although the present invention is described in detail based on several embodiments, it is apparent that the present invention is not limited thereto but can be variously changed within the scope not departing from the subject matter thereof.

The present invention is suitable for a data analysis technology when there is a need to rapidly reflect external information such as a stock price in stock trading, or an inter-vehicular distance in traffic information processing, as well as a change in an internal state such as a change in an amount of money or a change in a vehicle position as the processing objects, in a technology required to stably analyze data with low latency such as automatic stock trading, traffic information analysis, control of a manufacturing device, and click stream analysis.

What is claimed is:

1. A system for processing stream data based on a query, the system comprising:

a network interface that receives the stream data and a processor that processes the stream data, wherein the processor:

constructs an operator graph comprising information regarding a plurality of operators for processing the stream data based on the query;

assigns an operator execution order to the plurality of operators based on an inter-operator input and output relation, with respect to all of the operators on the operator graph;

extracts a set of the operators that maintains the stream data assigned with a time stamp, a time of which is earlier than or equal to a reference time, in an input queue; and executes processing of the stream data assigned with the time stamp, having the earliest time, in the operator assigned a minimum operator graph execution order among the operators and maintaining the stream data assigned with the time stamp having the earliest time, among the extracted set of the operators.

2. The system for processing stream data according to claim 1, wherein the processor, when the operator execution order is determined, simulates the operator graph to a directed graph having a directed side from an input side operator to an output side operator based on the inter-operator input and output relation, decomposes the directed graph into a set of strongly connected components, and determines whether the operator execution order assigned to all of the operators configuring an output side component is larger than the operator execution order assigned to any operator configuring an input side component, based on the inter-component input and output relation belonging to the set of the strongly connected components.

3. A method for processing stream data based on a query, the method comprising the step of:

receiving stream data;

constructing an operator graph comprising information regarding a plurality of operators for processing the stream data based on the query;

assigning an operator execution order to the plurality of operators based on an inter-operator input and output relation, with respect to all of the operators on the operator graph;

extracting a set of the operators that maintains the stream data assigned with a time stamp, a time of which is earlier than or equal to a reference time, in a input queue; and executing processing of the stream data assigned with the time stamp, having the earliest time, in the operator assigned a minimum operator graph execution order among the operators and maintaining the stream data assigned with the time stamp having the earliest time, among the extracted set of the operators.

4. The method for processing stream data according to claim 3, further comprising the steps of:

when the operator execution order is determined, simulating the operator graph to a directed graph having a directed side from an input side operator to an output side operator based on the inter-operator input and output relation;

decomposing the directed graph into a set of strongly connected components; and determining whether the operator execution order assigned to all of the operators configuring an output side component is larger than the operator execution order assigned to any operator configuring an input side component, based on the inter-component input and output relation belonging to the set of the strongly connected components.

* * * * *